US007353496B2

(12) United States Patent
Kimura et al.

(10) Patent No.: US 7,353,496 B2
(45) Date of Patent: Apr. 1, 2008

(54) STORAGE CONTROLLER SOFTWARE DEVELOPMENT SUPPORT SYSTEM AND SOFTWARE DEVELOPMENT SUPPORT METHOD

(75) Inventors: Takahisa Kimura, Odawara (JP); Hiroji Shibuya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 532 days.

(21) Appl. No.: 11/034,849

(22) Filed: Jan. 14, 2005

(65) Prior Publication Data
US 2006/0117306 A1 Jun. 1, 2006

(30) Foreign Application Priority Data
Nov. 25, 2004 (JP) ............... 2004-339832

(51) Int. Cl.
G06F 9/44 (2006.01)
G06F 13/10 (2006.01)
(52) U.S. Cl. ............ 717/121; 717/102; 710/74; 703/21; 703/22; 719/321
(58) Field of Classification Search ........ 719/325–327; 710/74; 717/102, 121
See application file for complete search history.

(56) References Cited
U.S. PATENT DOCUMENTS 6,006,022 A * 12/1999 Rhim et al. ................. 716/1
6,389,379 B1 * 5/2002 Lin et al. .................... 703/14
6,810,373 B1 * 10/2004 Harmon et al. ............. 703/14
7,107,202 B1 * 9/2006 Hegde et al. ............... 703/22
7,243,059 B2 * 7/2007 Crowell ..................... 703/22
2003/0167375 A1 * 9/2003 Morishita et al. .......... 711/112

FOREIGN PATENT DOCUMENTS

JP 2004-272830 3/2003

* cited by examiner

Primary Examiner—Eric B. Kiss
(74) Attorney, Agent, or Firm—Reed Smith LLP; Stanley P. Fisher, Esq.; Juan Carlos A. Marquez, Esq.

(57) ABSTRACT

In the present invention, the scope and degree of the effect of hardware alterations on software is grasped, and development is performed while making coordination between software and hardware. The storage system comprises a plurality of hardware elements and a plurality of software elements, and these respective elements are connected via a plurality of interface elements. The development support system respectively acquires and analyzes specification information relating to the hardware elements and software elements comprising the storage system, and produces software effect information that indicates the effect on the software. The development sections promote cooperative development while referring to the software effect information.

17 Claims, 23 Drawing Sheets

SOURCE METRICS INFORMATION TABLE (STATISTICS IN FUNCTION UNITS)

| INDEX | FUNCTION NAME | STEP NUMBER | MOTHER FUNCTION FanIn | DAUGHTER FUNCTION FanOut | MOTHER FUNCTION Tr-FanIn | DAUGHTER FUNCTION Tr-FanOut | PATH COMPLEXITY McCabe's Cyc-Complex. |
|---|---|---|---|---|---|---|---|
| 00001 | chx_xfrsts | 245 | 13 | 18 | 125 | 29 | 124,550 |
| 00002 | chr_xfrsts | 318 | 8 | 15 | 84 | 25 | 56,700 |
| ... | ... | ... | ... | ... | ... | ... | ... |
| 00245 | zcm_poltim | 150 | 9 | 7 | 28 | 57 | 3,480 |
| ... | ... | ... | ... | ... | ... | ... | ... |

FIG. 10

SOURCE METRICS INFORMATION TABLE (STATISTICS IN FUNCTION UNITS) 111B

| INDEX | FUNCTION NAME | STEP NUMBER | MOTHER FUNCTION FanIn | DAUGHTER FUNCTION FanOut | MOTHER FUNCTION Tr-FanIn | DAUGHTER FUNCTION Tr-FanOut | PATH COMPLEXITY McCabe's Cyc-Complex. |
|---|---|---|---|---|---|---|---|
| 00001 | chx | 5,235 | 98 | 142 | 245 | 196 | 1,124,550 |
| 00002 | chr | 3,456 | 102 | 115 | 198 | 156 | 856,450 |
| ... | ... | ... | ... | ... | ... | ... | ... |
| 00245 | zcm | 12,208 | 225 | 123 | 356 | 103 | 423,560 |
| ... | ... | ... | ... | ... | ... | ... | ... |

FIG. 13

HARDWARE I/F INFORMATION TABLE 121

| INDEX | HARDWARE NAME | REGISTER ID/ ADDRESS | REGISTER NAME | DESCRIPTION OF REGISTER | REGISTER TYPE | | |
|---|---|---|---|---|---|---|---|
| | | | | | K01 | K02 | ... K25 |
| 00001 | LCM | XR01 | XRXFRCTL | CONTROL OF BUFFER FOR TRANSFER TO CHL | O | | |
| 00002 | LCM | XR02 | XRRCVCTL | CONTROL OF BUFFER FOR RECEPTION FROM CHL | O | | |
| ... | ... | ... | ... | ... | | | |
| 00245 | FCM | X24000100 | FCMTIMO | INTERNAL TIMER OF FULL COPYING MODE | | O | |
| ... | ... | ... | ... | ... | | | |

| PROBLEM POINT CONTROL INDICATOR ||||||
|---|---|---|---|---|---|
| PROBLEM POINT CONTROL NUMBER (M#) | ITEM NAME | DATE OF OCCURRENCE | DEGREE OF IMPORTANCE | CORRESPONDENCE DISTINCTION | CORRESPONDENCE P# |
| M1 | ALL PAIRS SUSPENDED IN RESPECTIVE 512 PAIR HEAT RUN OF MIXED FRC SYNC/ASYNC | '04/05/25 | A | VIOLATION OF SPECIFICATIONS | P1 P3 |
| M2 | iSCI PORT BLOCKED | '04/08/31 | B | HARDWARE CORRESPONDENCE | P7 P8 |
| ... | ... | ... | ... | ... | ... |

Dq2

| PROGRAM ALTERATION CONTROL INDICATOR (CONTROL NAME: DISK CONTROL, CONTROL NUMBER : P3 ||
|---|---|
| ITEM NAME | ........ |
| GENERATED PRODUCT REV. | RAID_ABC 01 · 23 · 03 |
| CORRESPONDING PRODUCT REV. | RAID_ABC 01 · 23 · 04 |
| PHENOMENON | 1. CONSTRUCTION· · · · · · · · <br> 2. CONDITION · · · · · · · · · · · <br> 3. RESULT · · · · · · · |
| PHENOMENON KEYWORD | KEYWORD1, KEYWORD2, KEYWORD3 · · · |
| CAUSE | ........ |
| CAUSE KEYWORD | KEYWORD4, KEYWORD5, KEYWORD6 · · · |
| COUNTERMEASURE | ............... |
| COUNTERMEASURE KEYWORD | KEYWORD7, KEYWORD8 · · · |
| ALTERED FILE NAME | FILE034.c, FILE045.c, FILE023.h |
| ALTERED FUNCTION NAME | FUNC034a, FUNC045b |
| ALTERED TABLE NAME | TABLE023t |
| ALTERED MACRO NAME | MACRO17 |

FIG. 16

HARDWARE CORRESPONDENCE PROGRAM ALTERATION ITEM TABLE 131A

| INDEX | P NUMBER | M NUMBER | DEGREE OF URGENCY | CORRECTION CONTROL NAME | CORRECTED FILE | CORRECTED FUNCTION | OBJECT HARDWARE |
|---|---|---|---|---|---|---|---|
| 00001 | CHX040003 | QA040256 | A | CHX | chxxfrsts.c | chx_xfrsts | LCM |
| 00002 | CHR040014 | QA040256 | A | CHR | chrxfrsts.c | chr_xfrsts | LCM |
| ... | ... | ... | ... | ... | ... | ... | ... |

FIG. 17

131B HARDWARE CORRESPONDENCE ITEM STATISTICS TABLE

| INDEX | FUNCTION NAME | NUMBER OF ITEMS ACCORDING TO DEGREE OF URGENCY | | | | | TOTAL |
|---|---|---|---|---|---|---|---|
| | | A | B | C | D | E | |
| 00001 | chx_xfrsts | 14 | 10 | 8 | 11 | 3 | 46 |
| 00002 | chx_xfrerr | 13 | 6 | 2 | 1 | 8 | 30 |
| ⋮ | ⋮ | ⋮ | ⋮ | ⋮ | ⋮ | ⋮ | ⋮ |
| 00239 | zcm_poltim | 3 | 8 | 2 | 5 | 1 | 19 |
| ⋮ | ⋮ | ⋮ | ⋮ | ⋮ | ⋮ | ⋮ | ⋮ |

FIG. 23

SOFTWARE DEGREE-OF-EFFECT TABULATION TABLE ~151

| HARDWARE NAME | REGISTER CLASSIFICATION | SOFTWARE DEGREE OF EFFECT | REQUIRED NUMBER OF ESTIMATION PROCESSES (PERSONS × MONTHS) |
|---|---|---|---|
| CHM | ALL | 123,050 | 7,691 |
| CHM | K01 | 12,350 | 772 |
| CHM | K02 | 13,425 | 839 |
| CHM | K03 | 8,850 | 553 |
| ⋮ | ⋮ | ⋮ | ⋮ |
| CHM | K25 | 2,370 | 148 |
| ⋮ | ⋮ | ⋮ | ⋮ |
| LCM | ALL | 3,525 | 220 |
| LCM | K01 | 480 | 30 |
| LCM | K02 | 565 | 35 |
| ⋮ | ⋮ | ⋮ | ⋮ |
| LCM | K25 | 18 | 1 |
| ⋮ | ⋮ | ⋮ | ⋮ |

STORAGE CONTROLLER SOFTWARE DEVELOPMENT SUPPORT SYSTEM AND SOFTWARE DEVELOPMENT SUPPORT METHOD

CROSS-REFERENCE TO RELATED APPLICATIONS

This application relates to and claims priority from Japanese Patent Application No. 2004-339832 filed on Nov. 25, 2004, the entire disclosure of which is incorporated herein by reference.

BACKGROUND OF THE INVENTION

Field of the Invention

The present invention relates to a storage controller software development support system.

In storage controllers, for example, storage controllers such as hard disk drives, semiconductor memory devices or the like are disposed in the form of an array, so that storage areas based on an RAID (redundant array of independent disks) are constructed; these are also called disk array devices. Logical volumes (LUs: logical units) which are logical storage areas are formed in the physical storage areas of the respective disk drives, and these logical volumes are provided to host computers (hereafter referred to as "hosts").

For example, storage controllers are highly systematic products which are constructed by connecting various types of hardware and software such as communications control boards that control data communications with hosts, communications control boards that control data transfer with storage controllers, memory boards or memory devices that store various types of data and the like. These respective control boards are computer products that respectively contain microprocessors or the like; various types of hardware operate in cooperation as a result of various control boards executing respective control programs. Thus, storage controllers are large-scale system products that contain numerous microcomputer parts, and are constructed from numerous hardware resources and software resources.

Here, in cases where storage controllers are newly developed, for example, hardware specifications and software specifications are respectively determined on the basis of development goals, and separate development teams handle hardware and software. Both teams pursue respective development programs while communicating with each other either periodically or at irregular intervals. Then, the hardware and software are finally connected, and the operation is verified.

Since the software groups used in storage controllers are incorporated into hardware such as various types of control boards and the like, such software is also called "embedded software". In the case of such software that is built into hardware, source programs are created using a high level language such as C language or the like. An object code in a format that can be directly executed by a CPU (central processing unit) can be obtained by compiling such source programs by means of a specified compiler or the like. The object code thus obtained can be stored in a ROM (read only memory) or the like that is mounted on a control board.

Furthermore, although not used in software development for storage controllers, a software development support device is known which supports software development by automatically performing an altered code operating check (Japanese Patent Application Laid-Open No. 2004-272830).

In addition, development support tools which perform a static or dynamic analysis of software are also known.

In the case of the techniques described in the abovementioned references, the development of software can be supported to some extent; however, since only software development is the object of support, alterations in hardware specifications cannot be handled. Storage controllers are large-scale system products involving a high degree of cooperation between numerous software groups and numerous hardware groups, and there are cases in which hardware specifications are appropriately altered in accordance with market demands and the like.

When hardware is altered, the software groups utilizing this hardware are affected. For example, in cases where the clock frequency is altered, this has an effect on software groups that directly or indirectly utilize this clock frequency. Accordingly, in cases where hardware specifications are altered, there may be instances in which the specifications of the software utilizing this hardware must also be altered.

Thus, in the case of system products in which hardware groups and software groups are connected, alterations in the hardware specifications have an effect on the software specifications; as a result, software revisions and verification are necessary. Accordingly, in cases where hardware specifications are altered, the software developer must be notified of the content of these alterations in the specifications.

SUMMARY OF THE INVENTION

The present invention was devised in light of the abovementioned problem points, and it is one object of the present invention to provide a storage controller software development support system and software development support method which can support software development while taking into account the relationship between hardware and software. Another object of the present invention is to provide a storage controller software development support system and development support method which can predict the effects of alterations in hardware specifications on software, and which can promote development with coordination between hardware and software by providing this information to both the hardware developer and software developer. Other objects of the present invention will become clear from the following description of embodiments.

In order to solve the abovementioned problems, the storage controller software development support system of the present invention is a development support system which supports the development of the abovementioned software for a storage controller comprising a front-end control part which has an information processing system that is used to control the exchange of data with a host device, a storage controller group which provides a storage area, a back-end control part which has an information processing system that is used to control the exchange of data with this storage controller group, a memory part which is shared by the abovementioned front-end control part and the abovementioned back-end control part, and software which is respectively disposed in the abovementioned front-end control part and the abovementioned back-end control part, and which respectively controls the abovementioned respective information processing systems of these respective communications control parts, this storage controller software development support system comprising a software information analysis part which acquires specification information relating to the abovementioned software, and which analyzes the structure of specified software element groups that constitute this software, a hardware information analysis part which acquires specification information relating to the hardware respectively constituting at least the abovementioned front-end control part and the abovementioned back-end control part, and which analyzes the structure of specified hardware element groups that constitute the abovementioned hardware, a dependence relationship analysis part which analyzes the dependence relationship between the abovementioned hardware element groups and the abovementioned software element groups on the basis of the analysis results obtained by the abovementioned software information analysis part and the analysis results obtained by the abovementioned hardware information analysis part, a degree-of-effect prediction part which predicts, in cases where one or a plurality of the hardware elements in the abovementioned hardware element group are altered, the degree of the effect of this alteration on the abovementioned software element group, on the basis of the analysis results obtained by the abovementioned dependence relationship analysis part, and an information providing part which provides information indicating the degree of the effect that is predicted by the abovementioned degree-of-effect prediction part to the outside.

The specification information relating to the software may contain at least a source program, and the specification information relating to the hardware may contain at least information relating to the interface between the software and hardware. Furthermore, the software element groups may contain at least the function groups contained in the source program, and the hardware element groups may contain at least register groups relating to the interface. Moreover, (1) the software information analysis part may analyze the interrelationships between the respective functions of the function groups, (2) the hardware information analysis part may classify the register groups according to their function, (3) the dependence relationship analysis part may (3A) analyze the hierarchical structure of the function groups that directly or indirectly utilize the registers for each of the respective registers in the register groups, and detect the logical distance between the registers and the functions utilizing the registers for each of the registers on the basis of this analyzed hierarchical structure, (3B) analyze the conditions of utilization of the register groups for each of the functions of the function groups, and (3C) respectively detect the degree of dependence to which the respective functions depend on the respective registers, and (4) the degree-of-effect prediction part may respectively detect the degree of the effect that is exerted on each register of the register group in cases where the hardware corresponding to this register is altered, this degree of the effect being detected on the basis of the degree of dependence that is detected by the dependence relationship analysis part.

The degree-of-effect prediction part may acquire quality control information for the software, and may respectively detect the respective degrees of the effect on the basis of this acquired quality control information and the degree of dependence.

Furthermore, the storage controller software development support method according to another aspect of the present invention comprises a software information analysis step in which specification information relating to the software is acquired, and the structure of specified software element groups constituting this software is analyzed, a hardware information analysis step in which at least specification information relating to the hardware respectively constituting the front-end control part and the back-end control part is acquired, and the structure of specified hardware element groups constituting the hardware is analyzed, and a dependence relationship analysis step in which the dependence relationship between the hardware element groups and the software element groups is analyzed on the basis of the analysis results obtained in the software information analysis step and the analysis results obtained in the hardware information analysis step.

Furthermore, the method of the present invention may further comprise a degree-of-effect prediction step in which the degree of the effect that is exerted on software element groups by alterations in cases where one or a plurality of the hardware elements in the hardware element groups are altered is predicted on the basis of the analysis results obtained in the dependence relationship analysis step.

There may be instances in which some or all of the means or steps of the present invention can be realized by means of computer programs. For example, such computer programs can be fixed in recording media such as hard disk drives, semiconductor memory devices, optical disk drives or the like, and placed in circulation, or can be transmitted via communications networks.

BRIEF DESCRIPTION OF THE DRAWINGS

FIG. 9 is an explanatory diagram which shows a source metrics information table tabulated in function units;

FIG. 10 is an explanatory diagram which shows a source metrics information table tabulated in control units;

FIG. 13 is an explanatory diagram of the hardware I/F information table;

FIG. 15 is an explanatory diagram which respectively shows problem item lists and program change sheets;

FIG. 16 is an explanatory diagram of the hardware correspondence program alteration item table;

FIG. 17 is an explanatory diagram of the hardware correspondence item statistics table;

FIG. 23 is a flow chart which shows the software degree-of-effect statistics table.

DESCRIPTION OF THE PREFERRED EMBODIMENTS

Figure 1:
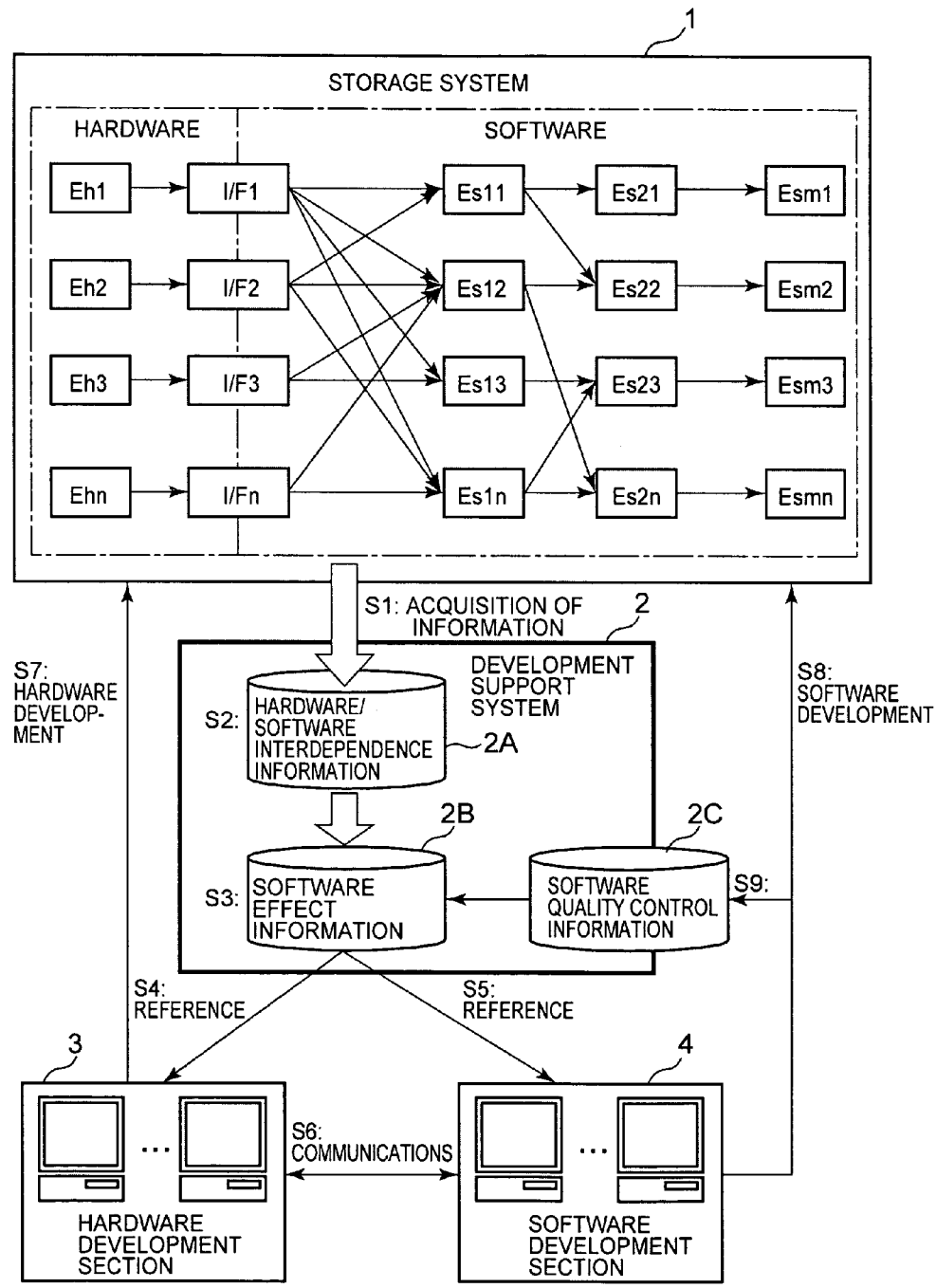
FIG. 1 is an explanatory diagram showing an overall outline of an embodiment of the present invention.

An embodiment of the present invention will be described with reference to FIG. 1. FIG. 1 is an explanatory diagram which shows an overall schematic view of an embodiment of the present invention in model form. The following invention is disclosed in this overall schematic view.

Specifically, the system shown in this figure is a development support system for embedded type software which supports the development of specified software that is incorporated into specified hardware, and that controls the operation of this hardware, this embedded type software development support system comprising a software information analysis part which acquires specification information relating to the abovementioned software, and which analyzes the structure of specified software element groups constituting the abovementioned software, a hardware information analysis part which acquires specification information relating to the abovementioned hardware, and which analyzes the structure of specified hardware element groups constituting the abovementioned hardware, a dependence relationship analysis part which analyzes the dependence relationship between the abovementioned hardware element groups and the abovementioned software element groups on the basis of the analysis results obtained by the abovementioned software information analysis part and the analysis results obtained by the abovementioned hardware information analysis part, and an information providing part which provides the analysis results obtained by the abovementioned dependence relationship analysis part to the outside.

Furthermore, in FIG. 1, a degree-of-effect prediction part is provided which predicts the degree of the effect of alterations on the abovementioned software element groups on the basis of the analysis results obtained by the abovementioned dependence relationship analysis part in cases where one or a plurality of the hardware elements in the abovementioned hardware element groups are altered, and the abovementioned information providing part provides the degree of the effect predicted by the abovementioned degree-of-effect prediction part to the outside instead of the analysis results obtained by the abovementioned dependence relationship analysis parts, or together with these analysis results.

The present embodiment will be described in detail with reference to FIG. 1. The storage system 1 is constructed so that this storage system comprises a plurality of hardware elements Eh1 through Ehn, and a plurality of software elements Es11 through Esmn, and these hardware and software elements are connected via a plurality of interface (hereafter abbreviated to "I/F") elements.

Here, examples of hardware elements include timers, buffers, cache memories, communications interfaces, logic LSIs and the like. Examples of software elements include functions, variables, macros, tables and the like. Examples of hardware and software interface elements include registers and the like that are employed in order to use the hardware elements.

The development support system 2 respectively acquires specification information relating to the hardware elements and software elements from the storage system 1 (S1). Here, the hardware specification information and software specification information may be acquired in the form of electronic data or non-electronic data, or as both types of data.

Specifically, for example, the hardware specification information and software specification information may be prepared and stored as specifications printed on a paper medium, or as electronic data fixed in a data recording medium such as a hard disk drive or the like. The development support system 2 acquires such electronic or non-electronic specification information. Furthermore, in cases where the specification information is non-electronic data, the development support system 2 can take in this specification information after converting the information into electronic data by using (for example) an imaging device such as a scanner, digital camera or the like. Furthermore, a construction may also be used in which all or part of the specification information is input manually by a system manager or the like.

The development support system 2 respectively analyzes the hardware specification information and software specification information, and analyzes the inter-dependence relationship between the hardware elements and software elements (S2). This analyzed inter-dependence information is stored in a data base 2A. The inter-dependence relationship information is information that indicates the relationship between the hardware element groups and the software element groups, i. e., information that indicates the degree to which the respective software elements utilize the respective hardware elements. For example, by focusing on interface elements such as registers or the like, it is possible to specify the respective software elements (Es11 through Es1n) that directly utilize the respective hardware elements. Furthermore, by analyzing the connection relationship (hierarchical structure) between the respective software elements, it is possible to grasp which software elements are using specified hardware elements via which software elements and the like.

On the basis of the inter-dependence information and software quality control information, the development support system 2 produces software effect information that indicates the effect on the software (S3). The software effect information is information indicating the degree of the effect exerted on the respective software elements by alterations in a certain hardware element. This software effect information is recorded in a data base 2B, and is respectively provided to a hardware development section 3 and a software development section 4. The software effect information is shared by the respective sections 3 and 4.

In the hardware development section 3, the scope, magnitude and the like of the effect exerted on the software by currently planned specification alterations can be confirmed in advance as a result of reference being made to the software effect information (S4). Similarly, in the software development section 4 as well, the effect of planned alterations in the hardware on the software can be grasped in advance by referring to the software effect information (S5).

As a result of the respective sections 3 and 4 respectively referring to the software effect information, the respective sections 3 and 4 may have a common recognition. Moreover, the respective sections 3 and 4 can also perform mutual communications on the basis of this common recognition (S6).

The hardware development section 3 can perform design revisions and the like after confirming the effect of the specification alterations on the software beforehand (S7). Similarly, the software development section 4 can perform revisions or the like for all of the software elements that are affected by hardware specification alterations (S8).

Information relating to software specification alterations is recorded in a data base 2C as software quality control information (S9). The software quality control information can include the quality history of the software and the like. Specifically, for example, in cases where an abnormality is detected in the behavior of a certain hardware element, the bug in the software element controlling this hardware element is specified, and information relating to this bug is recorded.

Accordingly, the frequency of problems generated in the past and the like can be ascertained by referring to the software quality control information. Thus, the development support system 2 is devised so that this system 2 can produce software effect information on the basis of software quality control information and inter-dependence information. The progression of the development performed by the respective sections 3 and 4 is reflected in the inter-dependence information, and the software effect information is updated.

Thus, the development support system 2 of the present embodiment respectively analyzes the structure of the software element groups and the structure of the hardware element groups on the basis of the software specification information and hardware specification information. Furthermore, the development support system 2 obtains dependence relationship information that indicates the dependence relationship between the software element groups and hardware element groups on the basis of both sets of analysis results. Moreover, the development support system 2 produces software effect information that predicts the degree of the effect of the alteration on the software element groups on the basis of the basis of the dependence relationship information in cases where one or a plurality of the hardware elements in the hardware element groups are altered, and respectively provides this information to the respective sections 3 and 4.

Accordingly, in the present embodiment, the hardware development section 3 and software development section 4 can obtain a shared recognition by respectively referring to the software effect information, and can respectively promote development while mutually communicating on the basis of this common recognition. As a result, in the present embodiment, both the hardware development section 3 and software development section 4 can jointly promote the development of the storage system 1 while cooperating. Accordingly, in the present embodiment, an increase in the number of development processes and an increase in the development time, which occur due to the generation of software revision work and verification work as a result of hardware specification alterations in which almost no consideration is given to effects on the software (as in conventional techniques) can be suppressed in advance. In the present embodiment, the total number of processes required for storage system development can be reduced, so that an increase in cost can be prevented; furthermore, this is also useful in improving quality.

Furthermore, by referring to the software effect information for a storage system that has already been developed, it is possible to utilize this information in the design of a storage system for which new development is planned. Specifically, for example, this can also be utilized when development plans for new models are set, so that the investigation is given priority according to the greater degree of importance in the case of hardware specifications in which the degree of the effect on the software is great, and so that the development is handled with flexibility in the case of hardware specifications that have little effect on the software. The present embodiment will be described in greater detail below with reference to other figures.

EXAMPLES

Figure 2:
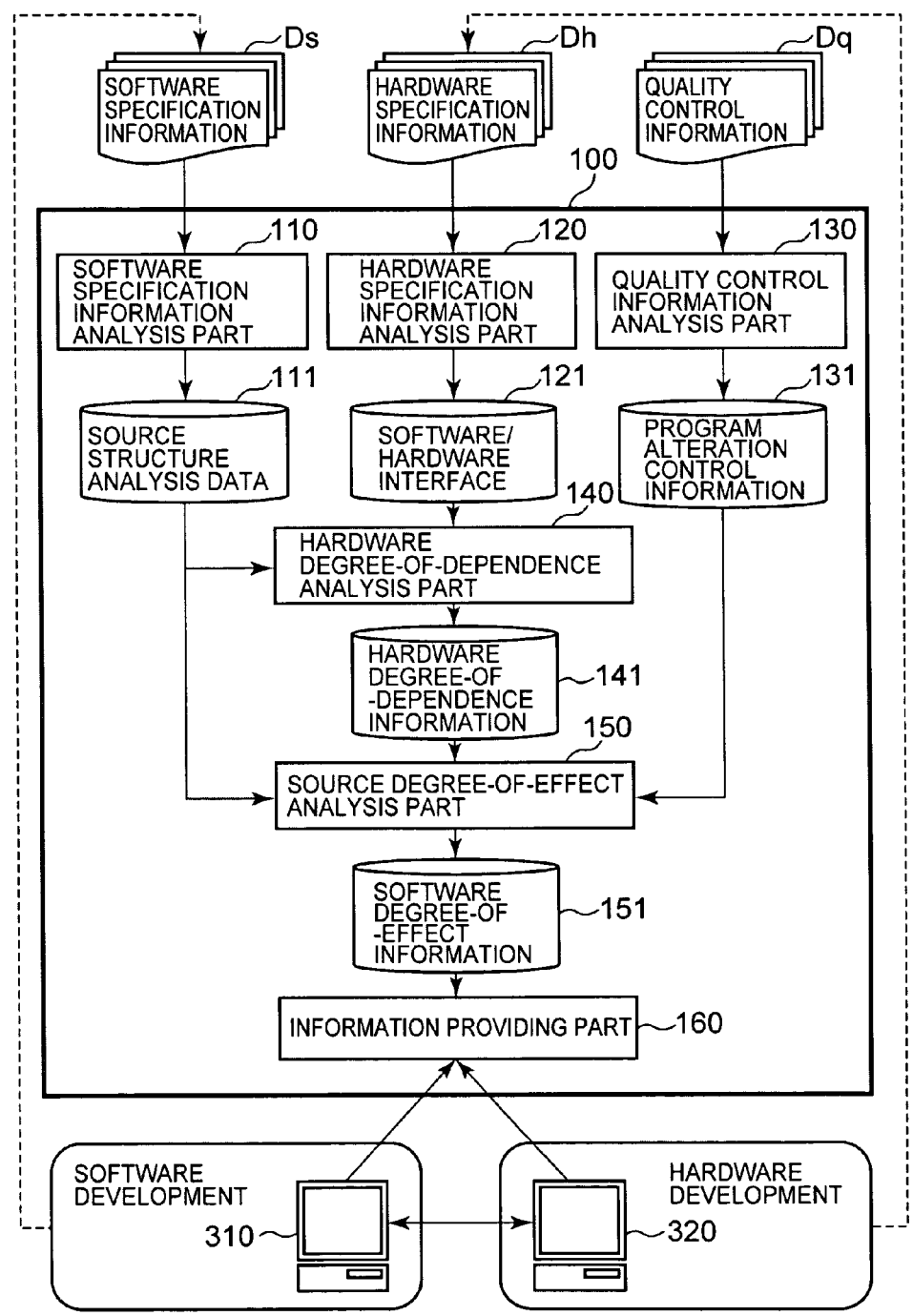
FIG. 2 is a block diagram showing the overall development support system according to an embodiment of the present invention.

FIG. 2 is a structural explanatory diagram which shows an overall view of the storage controller software development support system 100. For example, this development support system 100 can be constructed so that this system comprises a software specification information analysis part 110, a hardware specification information analysis part 120, a quality control information analysis part 130, a hardware degree-of-dependence analysis part 140, a source degree-of-effect analysis part 150, an information providing part 160 and the like.

Furthermore, the development support system 100 can respectively control source structure analysis data 111, software-hardware interface analysis data (hereafter also referred to as "interface analysis data") 121, program alteration control information 131, hardware degree-of-dependence information 141 and software degree-of-effect information 151.

For example, the development support system 100 can be realized in a computer device such as a server machine or the like, and is respectively connected with terminals 310 of the software development section and terminals 320 of the hardware development section so that communications are possible. The development support system 100 can respectively provide information to the respective terminals 310 and 320. In each section, software and hardware specifications can be altered on the basis of information obtained from the development support system 100.

The respective functions of the development support system 100 will be briefly described. Details of these respective functions will be separately described later. First, at least three types of information Ds, Dh and Dq can be respectively input into the development support system 100. The software specification information Ds is information that indicates the construction of the source file (source program), i.e., definitions of the source code, functions, macros and the like. The hardware specification information Dh is information that indicates the specifications of the hardware elements that make up the storage controller, especially computer-controlled elements. The quality control information Dq is information that indicates the quality of the source file (history of trouble countermeasures and the like).

These sets of information Ds, Dh and Dq are prepared as electronic data such as document files or the like in some cases, and are prepared as non-electronic data printed on a paper medium in other cases. Furthermore, there may also be cases in which some of the data is electronic, and some of the data is printed on a paper medium. In the case of data that is non-electronic, for example, this data can be converted into electronic data using a scanner device, digital camera or the like, and then input into the development support system 100.

The software specification information analysis part 110 analyzes the software structure of the storage controller on the basis of the software specification information Ds. The results of the analysis performed by the software specification information analysis part 110 are controlled as source structure analysis data 111. For example, the source structure analysis data 111 can contain respective entities such as functions, variables, macros, tables and the like contained in the source file, and information indicating the cross-reference state between these respective entities and the like.

The hardware specification information analysis part 120 analyzes the hardware structure of the storage controller on the basis of the hardware specification information Dh. For example, the hardware specification information analysis part 120 analyzes the structure of the hardware by investigating external registers that connect the hardware and software. These analysis results are controlled as interface analysis data 121. For example, the interface analysis data 121 may contain the numbers of the respective external registers, the names (applications) of these registers, the definitions of control bits, the types of control bits and the like.

The quality control information analysis part 130 the quality of the software, e. g., the alteration history of the program, on the basis of the quality control information Dq. These analysis results are controlled as program alteration control information 131. For example, the program alteration control information 131 may contain past problem points arising in this program, the locations and contents of corrections performed in order to solve these problem points, the names of hardware with which this program is associated and the like.

The hardware degree-of-dependence analysis part 140 analyzes the dependence relationship between the software and hardware on the basis of the source structure analysis data 111 and interface analysis data 121. Specifically, the question of which software elements (functions, macros, variables and the like) are utilizing which hardware elements and the like can be grasped by a comparative investigation of the structure relating to the interface between software and hardware, and the internal structure of the software. These analysis results are controlled as hardware degree-of-dependence information 141. For example, the hardware degree-of-dependence information 141 may contain numerical values indicating the degree of dependence of one or a plurality of software elements relating to various hardware elements.

The source degree-of-effect analysis part 150 analyzes the degree of the effect of alterations in the specification of hardware elements on the source file on the basis of the source structure analysis data 111, hardware degree-of-dependence information 141 and program alteration control information 131. These analysis results are controlled as software degree-of-effect information 151.

The information providing part 160 is used to respectively provide the software degree-of-effect information 151 to the respective terminals 310 and 320. For example, the information providing part 160 can be constructed so that this part comprises a web server function. In this case, the respective terminals 310 and 320 can refer to the software degree-of-effect information 151 by using a web browser. Furthermore, this part is not limited to cases in which software degree-of-effect information 151 is provided; this part may also have a construction that can provide hardware degree-of-dependence information 141 or other analysis data 111, 121 and 131 used to produce the software degree-of-effect information 151 to the respective terminals 310 and 320.

The hardware development section and software development section can refer to the software degree-of-effect information 151, grasp in advance the effect of hardware specification alterations on the software, and cooperate in advance with respect to these hardware specification alterations. Furthermore, in the hardware development section, for example, hardware specification alterations can be determined with the overall development process and period (including software development) and the cost involved being taken into account. Moreover, in the software development section, the effects of these hardware specification alterations can be grasped in advance for all source files, so that the correction of these source files can be performed without any accidental omissions.

The storage controller 10 can be cited as an example of a system product whose development can be supported by the development support system 100. The construction of this storage controller 10 will be described with reference to FIGS. 3 and 4.

Figure 3:
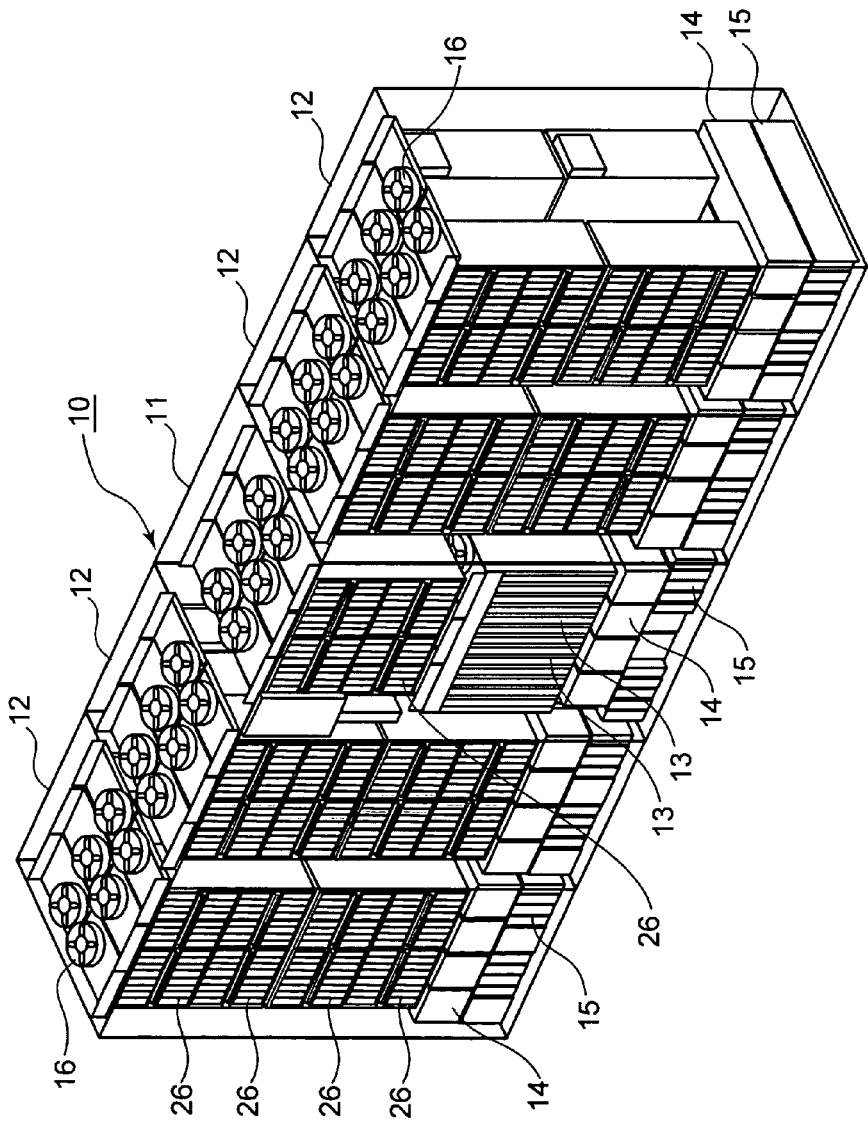
FIG. 3 is an external view of a storage controller in which the development support system is used.

FIG. 3 is a schematic perspective view which shows one example of the external construction of the storage controller 10. For example, the storage controller 10 can be constructed from a basic housing 11 and a plurality of additional housings 12. The basic housing 11 is the minimal structural unit of the storage controller 10, and comprises both a storage function and a control function. The additional housing 12 are options of the storage controller 10, and are controlled by the control function of the basic housing 11. For example, a maximum of four additional housings 12 can be connected to the basic housing 11.

A plurality of control packages 13, a plurality of power supply units 14, a plurality of battery units 15 and a plurality of disk drives 26 are respectively detachably mounted on the basic housing 11. A plurality of disk drives 26, a plurality of power supply units 14 and a plurality of battery units 15 are respectively detachably mounted on each of the additional housing 12. Furthermore, a plurality of cooling fans 16 are also respectively mounted on the basic housing 11 and the respective additional housings 12.

The control packages 13 are modules that are respectively used to realize channel adapters (hereafter referred to as CHAs) 21, disk adapters (hereafter referred to as DKAs) 22, a cache memory 23 and the like which will be described later. Specifically, a plurality of CHA packages, a plurality of DKA packages and one or more memory packages are respectively detachably mounted on the basic housing 11, and can be replaced in package units.

Figure 4:
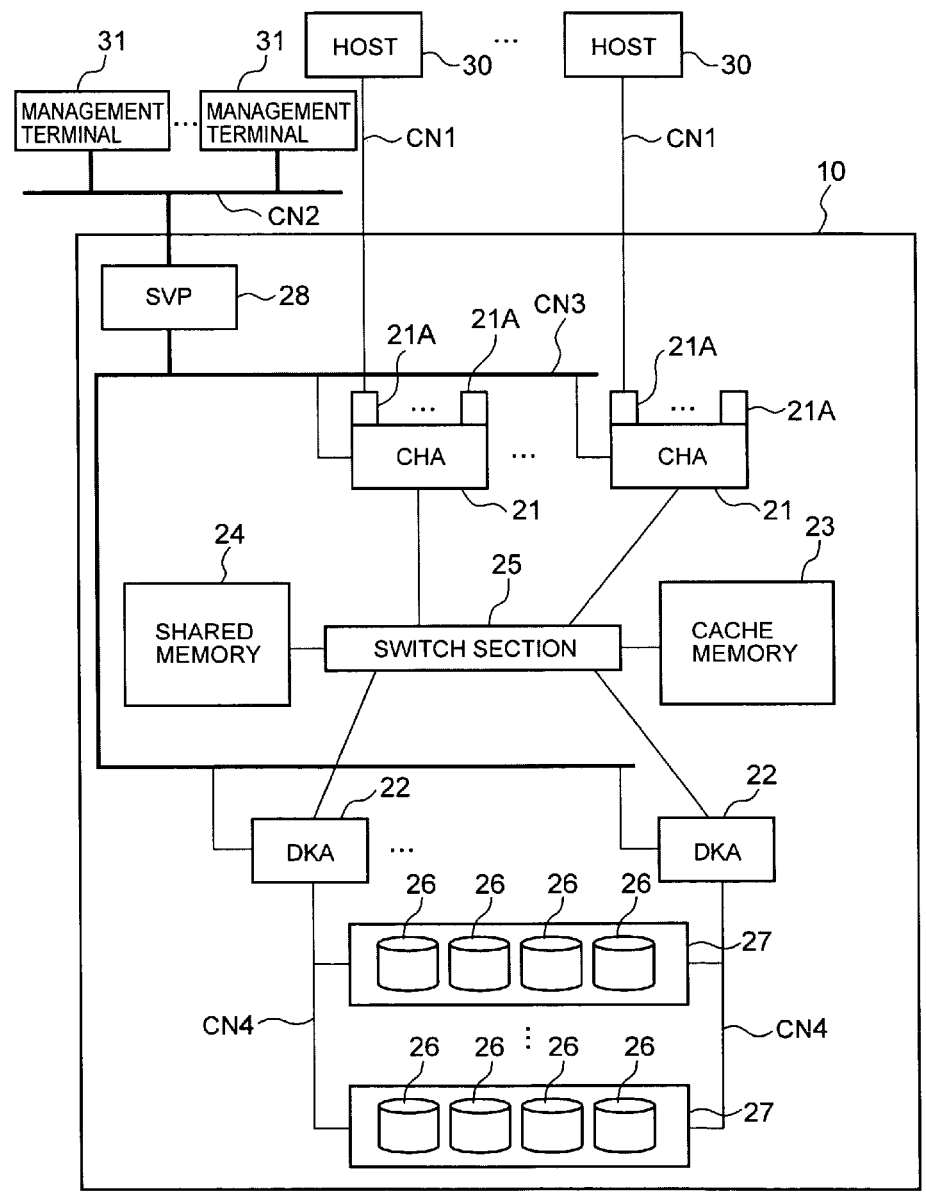
FIG. 4 is a block diagram of the storage controller.

FIG. 4 is a block diagram which shows an overall outline of the storage controller 10. The storage controller 10 can be respectively connected to a plurality of host computers (hereafter referred to as hosts) 30 via a communications network CN1 so that two-way communications are possible.

For example, an LAN (local area network), SAN (storage area network), the internet, a dedicated circuit or the like can be used as the communications network CN1. In cases where an LAN is used, data transfer between the hosts 30 and the storage controller 10 is performed according to TCP/IP. In cases where an SAN is used, the hosts 30 and storage controller 10 perform data transfer according to a fiber channel protocol. In cases where the hosts 30 are main frame computers, for example, data transfer is performed according to a communications protocol such as FICON (Fiber Connection: registered trademark), ESCON (Enterprise System Connection: registered trademark), ACONARC (Advanced Connection Architecture: registered trademark), FIBARC (Fiber Connection Architecture) or the like.

For example, each host 30 can be realized as a server, personal computer, workstation, main frame or the like. For instance, each host can be connected to a plurality of client terminals positioned outside the figure via a separate communications network. For example, each host 30 can provide a service to the respective client terminals by reading and writing data from and into the storage controller 10 in accordance with requests from the respective client terminals.

The respective CHAs 21 control the transfer of data with the respective hosts 30, and comprise a plurality of communications ports 21A. For example, the CHAs 21 can be prepared as open type CHAs or main frame type CHAs 21 in accordance with the type of host 30. Each CHA 21 receives data and commands requesting the reading or writing of data from the respectively connected hosts 30, and operates in accordance with the commands received from the hosts 30. Each CHA 21 can respectively separately control I/O requests from a plurality of hosts 30.

First, to give a description including the operation of the DKAs 22, when a CHA 21 receives a read command from a host 30, the CHA 21 stores this read command in the shared memory 24. Each DKA 22 occasionally refers to the shared memory 24, and if an unprocessed read command is discovered, data is read out from the corresponding disk drive 26, and is stored in the cache memory 23. The CHA 21 reads out the data transferred to the cache memory 23, and transmits this data to the host 30.

Meanwhile, when the CHA 21 receives a write command from a host 30, the CHA 21 stores this write command in the shared memory 24. Furthermore, the CHA 21 stores the received data I the cache memory 23. After the CHA 21 has stored the data in the cache memory 23, the CHA 21 reports the completion of writing to the host 30. In accordance with the write command stored in the shared memory 24, the DKA 22 reads out the data stored in the cache memory 23, and stores this data in a specified disk drive 26.

A plurality of the respective DKAs 22 can be disposed inside the storage controller 10. The respective DKAs 22 control data communications with the respective disk drives 26. For example, the respective DKAs 22 and the respective disk drives 26 are connected via a communications network CN4 such as an SAN or the like, and data transfer in block units is performed according to a fiber channel protocol. The respective DKAs 22 occasionally monitor the states of the disk drives 26, and the results of this monitoring are transmitted to the SVP 28 via an internal network CN3.

For example, the respective CHAs 21 and respective DKAs 22 each comprise a printed board on which a processor, memory and the like are mounted, and a control program that is stored in the memory; these parts are devised so that respective specified functions are realized by the cooperative action of these hardware and software elements. The control program that is installed in each CHA 21 and each DKA 22 controls the overall operation of the storage controller 10. Furthermore, details of the CHAs 21 and DKAs 22 will be described later.

For example, the cache memory 23 stores data and the like. For instance, the cache memory 23 is constructed from a non-volatile memory. Furthermore, for example, the shared memory (or control memory) 24 is constructed from a non-volatile memory. For instance, control information, management information and the like are stored in the shared memory 24. This information such as control information and the like can be controlled in a multiplex manner by a plurality of shared memories 24. A plurality of shared memories 24 and cache memories 23 can respectively be installed. Furthermore, cache memories 23 and shared memories 24 can be mounted in a mixed configuration on the same memory board. Alternatively, a portion of one memory can be used as a cache region, and another portion of this same memory can be used as a control region.

The switching part 25 respectively connects the respective CHAs 21, the respective DKAs 22, the cache memory 23 and the shared memory 24. As a result, all of these parts, i.e., the CHAs 21, DKAs 22, cache memory 23 and shared memory 24, can be respectively accessed. For instance, the switching part 25 can be constructed as an ultra-high-speed cross bar switch or the like.

The storage controller 10 can mount of plurality of disk drives 26. For instance, each disk drive 26 can be realized as a hard disk drive (HDD), semiconductor memory device, optical disk drive, optical-magnetic disk drive or equivalent. Furthermore, in cases where HDDs are used as the disk drives 26, for example, HDDs such as FC (fiber channel) disks, SATA (serial AT attachment) disks, SCSI (small computer system interface) disks or the like can be used. Moreover, a plurality of different types of HDDs can respectively be used.

The disk drives 26 are physical storage controllers. Although this differs according to the RAID construction and the like, for example, an RAID group (also called a parity group) which is a virtual logical region is constructed in a physical storage area in which four disk drives 26 constituting one set are provided. Furthermore, one or more logical devices (also called logical volumes) can be set in an RAID group 27. Such logical devices can be recognized by an open type host 30 by associating these logical devices with LUNs (logical unit numbers). In the case of a main frame type host, the logical devices can be directly recognized.

Furthermore, it is not necessary that all of the memory resources used by the storage controller 10 be disposed inside the storage controller 10. The storage controller 10 can also incorporate and use memory resources that are located outside the storage controller 10 as though these memory resources were its own memory resources.

The service processor (SVP) 28 is respectively connected to the respective CHAs 21 and respective DKAs 22 via an internal network CN3 such as an LAN or the like. Furthermore, the SVP 28 can be connected to a plurality of control terminals 31 via a communications network CN2 such as an LAN or the like. The SVP 28 collects various internal states of the storage controller 10, and provides these states to the control terminals 31.

Figure 5:
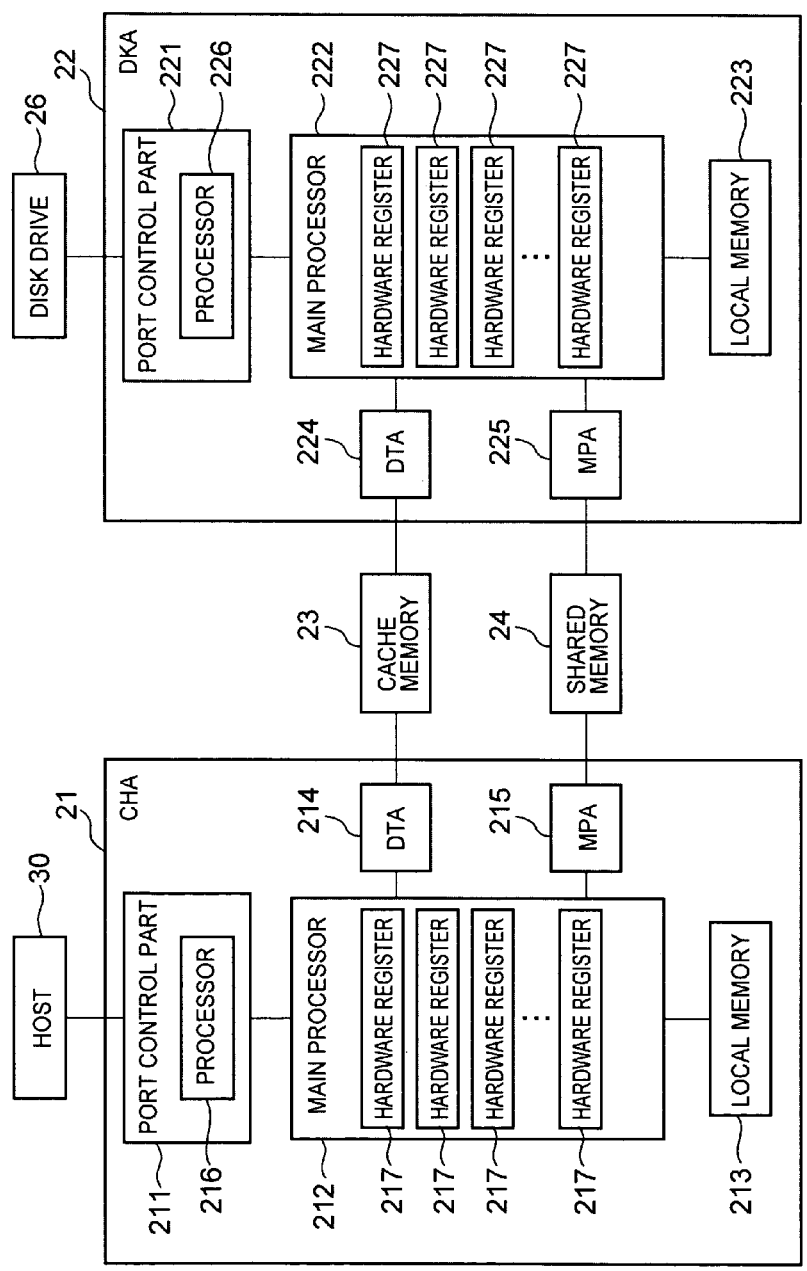
FIG. 5 is an explanatory diagram showing the relationship of the CHAs and DKAs, and the schematic structures of both of these parts.

Next, FIG. 5 is a block diagram which shows an outline of the essential parts of the CHAs 21 and DKAs 22. The CHAs 21 will be described first. For example, each CHA 21 is constructed so that this CHA 21 comprises a port control part 211, a main processor 212, a local memory 213, a data transfer adapter (DTA) 214, and a micro-program adapter (MPA) 215.

The port control part 211 comprises a processor 216, and performs data communications with the hosts 30 according to a specified communications protocol. The main processor 212 controls the operation of the CHA 21, and comprises a plurality of hardware registers 217. A local memory 213 is connected to the main processor 212. For example, control information and the like used by the CHA 21 (among the control information stored in the shared memory 24) is copied into the local memory 213.

The DTA 214 performs data transfer with the cache memory 23. The MPA 215 performs data transfer with the shared memory 24. The main processor 212 stores a command received from the host 30 in the shared memory 24 via the MPA 215. The main processor 212 stores write data received from the host 30 in the cache memory 23 via the DTA 214. Furthermore, the main processor 212 reads out data from the cache memory 23 via the DTA 214. This read-out data is transmitted to the host 30 via the port control part 211.

Like the CHAs 21, the DKAs 22 can also be constructed so that these parts comprise (for example) a port control part 221, a main processor 222, a local memory 223, a DTA 224, and an MPA 225.

The port control part 221 controls data transfer with the disk drives 26, and comprises a processor 226. The main processor 222 controls the operation of the DKA 22, and may comprise a plurality of hardware registers 227. For example, control information and the like required in order to control the operation of the DKA 22 can be stored in the local memory 223. Furthermore, the DTA 224 performs data transfer with the cache memory 23. The MPA 225, performs data transfer with the shared memory 24.

Figure 6:
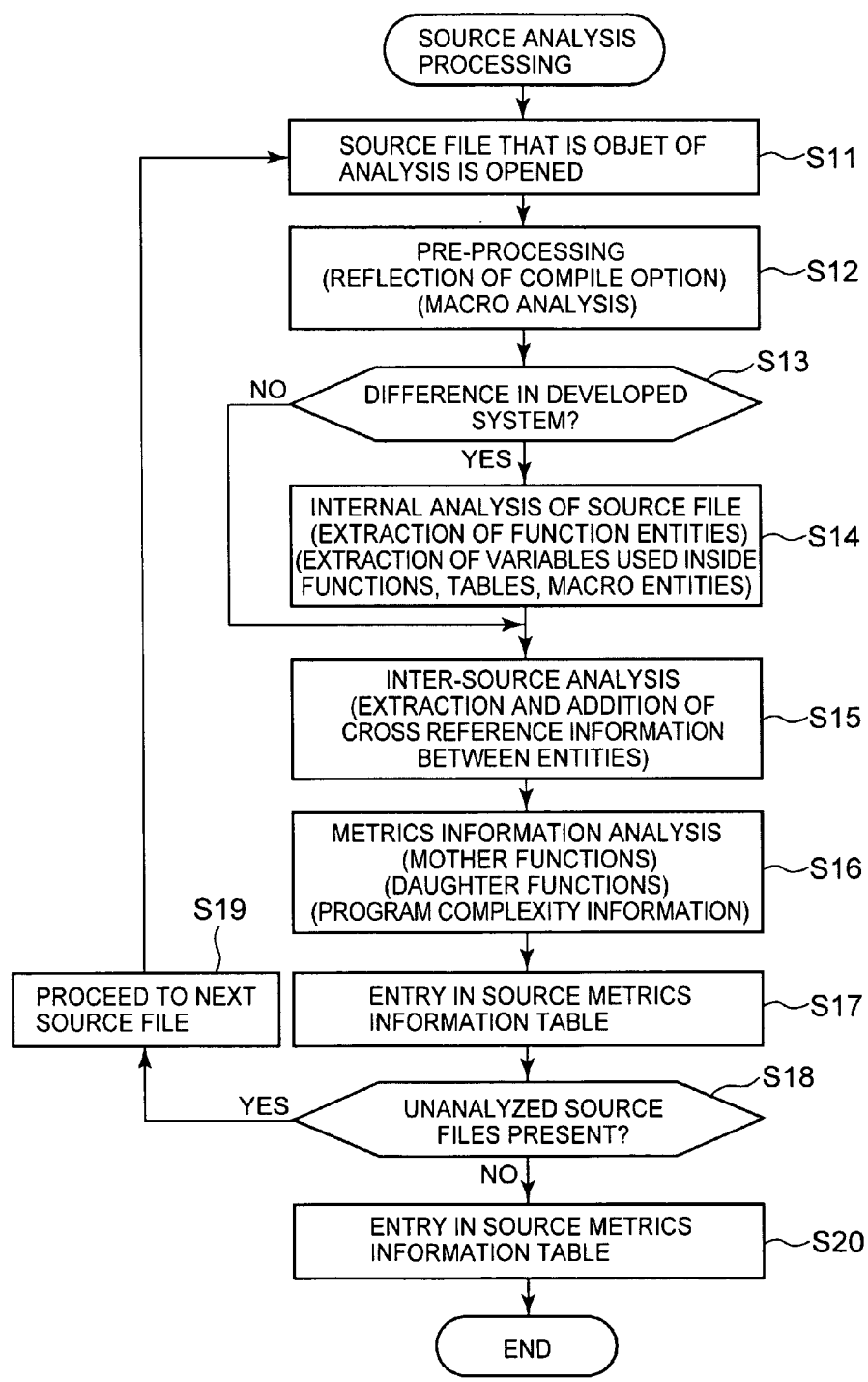
FIG. 6 is a flow chart showing the source analysis processing.

Next, details of the respective functions of the development support system 100 will be described. FIG. 6 is a flow chart which shows an outline of the source program analysis processing (in the figures, source program or source file may be abbreviated to "source" in some cases) that is performed by the software specification information analysis part 110 in FIG. 2.

Figure 7:
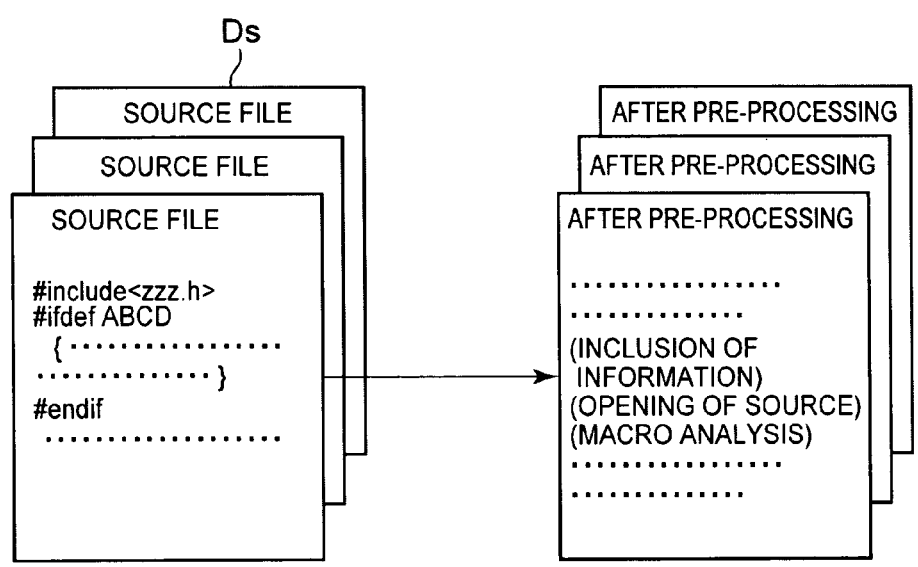
FIG. 7 is an explanatory diagram which shows in model form how source files are pre-processed.

The development support system 100 (hereafter also referred to as the "system 100") selects and opens one source file that is the object of analysis (among a series of source files contained in a specified control or a specified project) (S11). The system 100 executes pre-processing of the selected source file (S12). In this pre-processing, for example, compile options such as whether or not to compile a debugging code or the like are reflected; furthermore, macros are resolved or the like. Reference is now made to FIG. 7. As a result of the pre-processing of the source file as software specification information Ds, information is included, the source code is developed, macros are resolved, and the like. Consequently, an intermediate file prior to compilation is produced.

The description now returns to FIG. 6. Next, the system 100 judges whether or not this pre-processed code (also called the developed system) has varied compared to the previous time of analysis (S13). In cases where there is a difference in the developed system (S13: YES), this indicates a case in which the source file has been corrected; accordingly, an internal analysis of the source file is performed (S14). In this internal analysis, for example, extraction of the function entities contained in the source file, extraction of the variables contained in the respective functions, extraction of the respective tables used by the source file, extraction of the macro entities contained in the source file and the like are performed. On the other hand, in cases where the code following pre-processing does not vary from the previous time (S13: NO), S14 is skipped.

Next, the system 100 performs an inter-source file analysis (S15). In this inter-source file analysis processing, for example, the conditions of cross reference between the respective entities are grasped. Specifically, in S15, inter-function cross reference information indicating which functions refer to which functions, or which functions are referred to by which functions, is detected. Furthermore, in S15, cross reference information between variables (macros) and functions is detected. Moreover, in S15, cross reference information between macros is detected.

Figure 8:
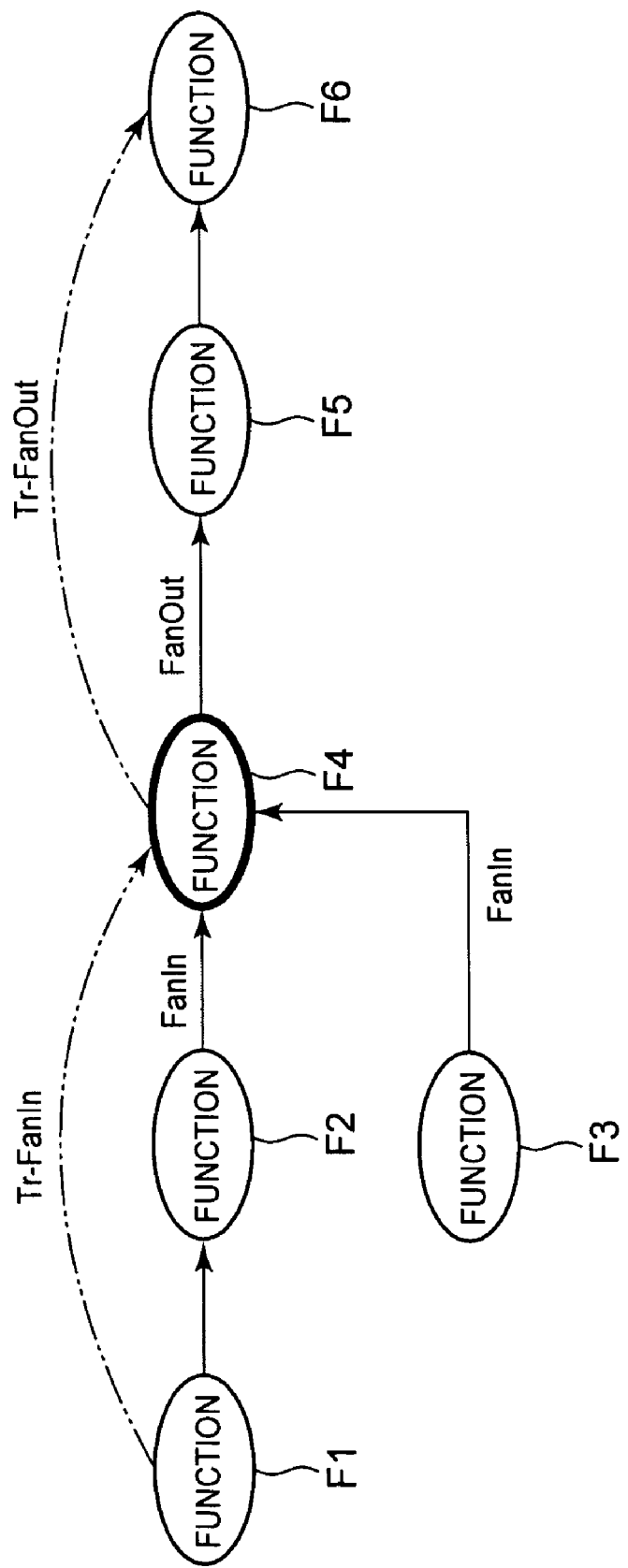
FIG. 8 is an explanatory diagram which shows the mother-daughter relationship between functions in model form.

Next, the system 100 performs an analysis of metrics information (S16). For example, in this metrics information analysis, the number of mother functions (Fan-IN), the number of daughter functions (Fan-OUT), program complexity information and the like are analyzed. In cases where program complexity information is obtained, for example, a procedure such as McCabe's metrics/Halstead's metrics or the like can be used. The relationship between mother functions and daughter functions is shown in FIG. 8. Here, there is a focus on a certain function F4. The calculation results of a function F2 and function F3 are respectively directly input into this function F4 (Fan-IN). The calculation results of a function F1 are indirectly input into the function F4 via the function F2 (transitive Fan-IN). The calculation results of the function F4 are directly output into a function F5 (Fan-OUT). Furthermore, the calculation results of the function F4 are indirectly output into a function F6 via the function F5 (transitive Fan-OUT). Thus, in S16, the parent-daughter relationship of the respective functions is grasped.

The description now returns to FIG. 6. The system 100 enters the analysis results into the source metrics information table 111A (S17). Furthermore, in S17, the abovementioned analysis results are tabulated and registered in source file units or function units.

Then, the system 100 judges whether or not any unanalyzed source files are present (S18). In cases where unanalyzed source files are present (S18: YES), the system 100 proceeds to the next source file (S19), and repeats the processing of the abovementioned S11 through S17. In cases where all of the source files to be analyzed have been analyzed (S18: NO), the system 100 tabulates and registers the results in control units or project units in the source metrics information table 111B (S20).

FIG. 9 is an explanatory diagram which shows one example of the source metrics information table 111A that is produced in S17. FIG. 9 shows the results of statistics in respective function units. For example, this source metrics information table 111A can be constructed by respectively associating the index numbers of the respective records, the function names, the numbers of steps of the functions, the number of mother functions (Fan-IN), the number of daughter functions (Fan-OUT), the number of indirect mother functions (transitive Fan-IN), the number of indirect daughter functions (transitive Fan-OUT), and the path complexity information.

FIG. 10 is an explanatory diagram which shows one example of the source metrics information table 111B that is produced in S20. FIG. 10 shows the results of statistics in control units. Accordingly, in the table 111B, the respective analysis results are tabulated in respective control units.

Figure 11:
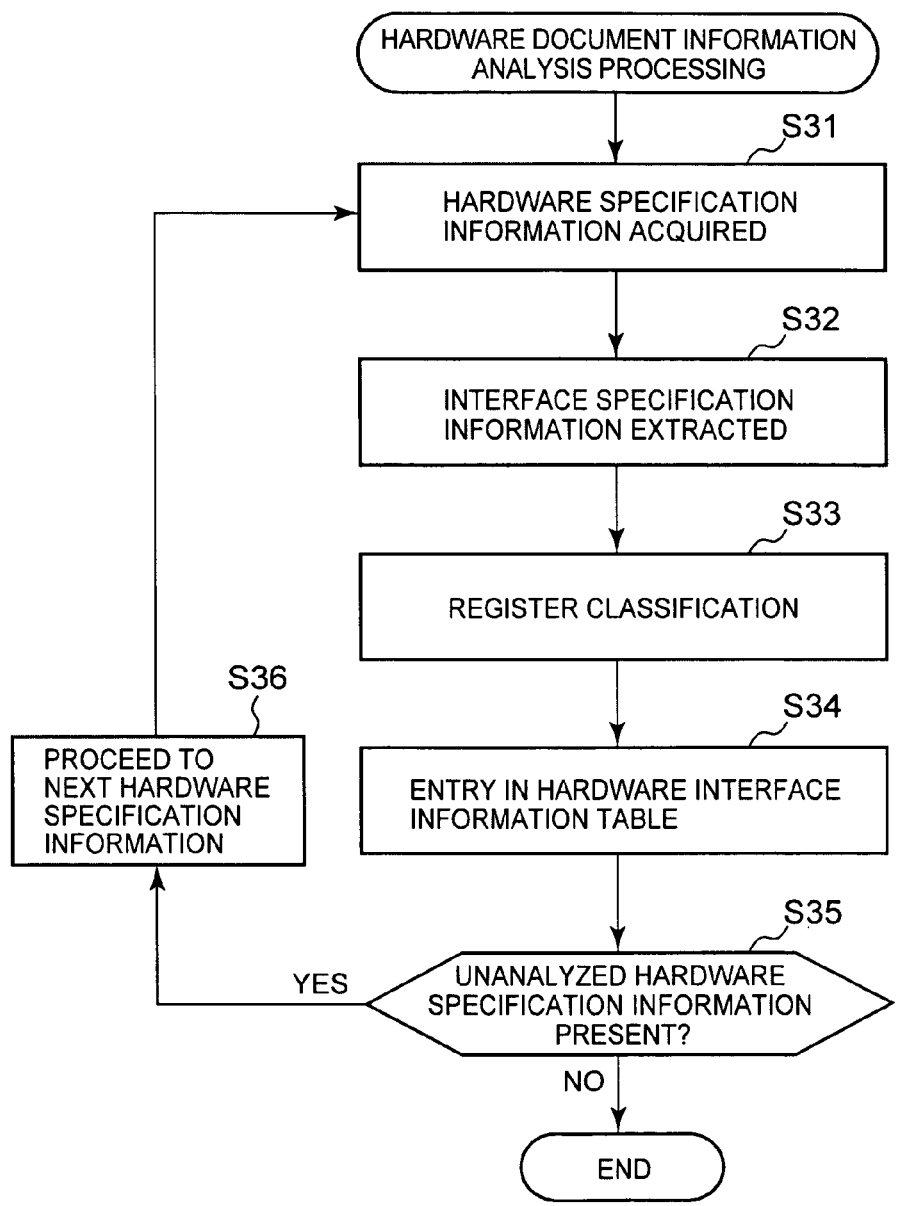
FIG. 11 is a flow chart which shows hardware document information analysis processing.

FIG. 11 is a flow chart which shows an outline of the hardware document information analysis processing that is performed by the hardware specification information analysis part 120 shown in FIG. 2. The hardware specifications are used by the abovementioned hardware documents as hardware specification information Dh.

Figure 12:
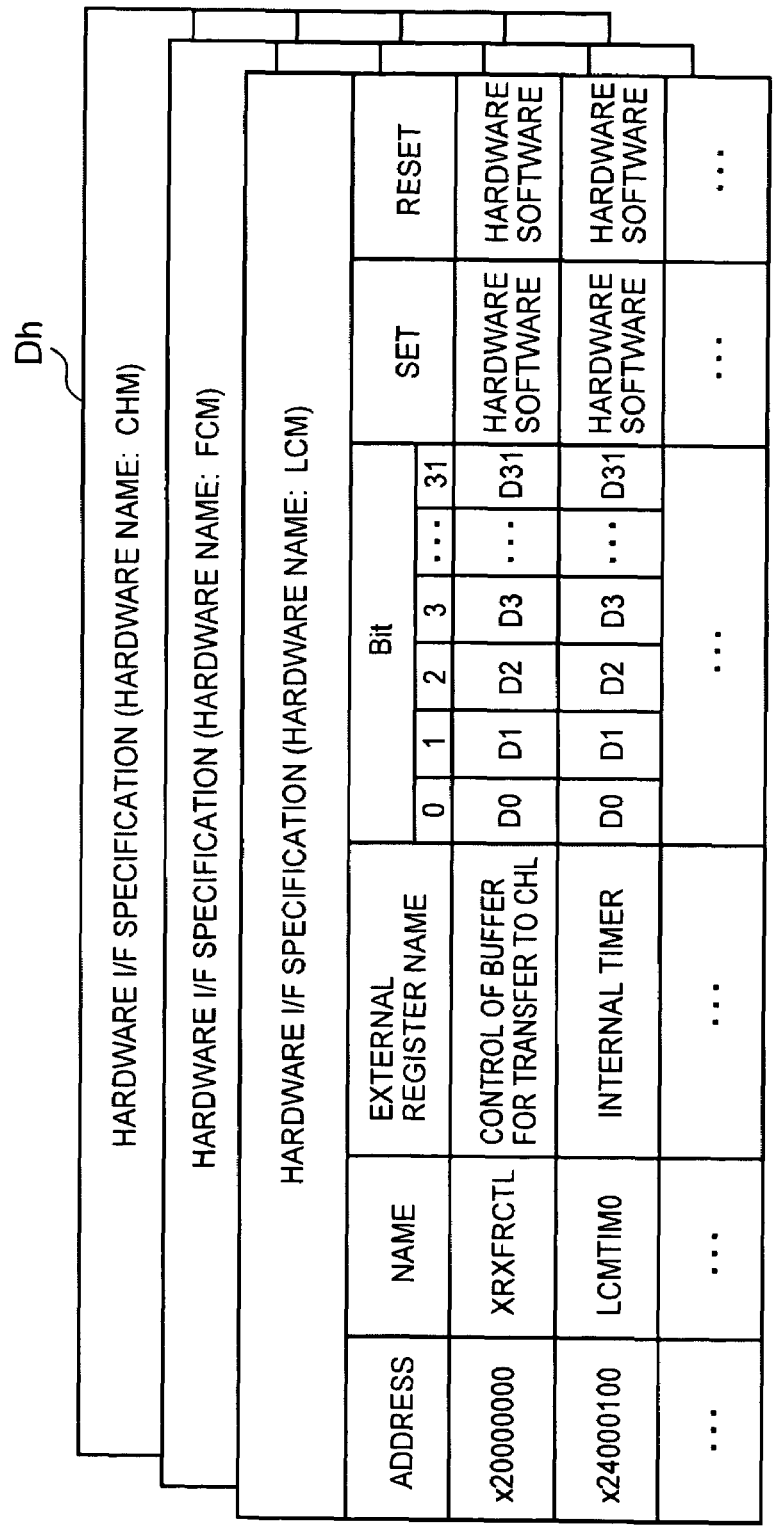
FIG. 12 is an explanatory diagram of the hardware specification information.

Next, reference is made to FIG. 12. FIG. 12 is an explanatory diagram which shows one example of the hardware specification information Dh; here, the hardware specification information is respectively prepared for each hardware element. Furthermore, for example, the specification information for these respective hardware elements can be constructed by respectively associating the addresses of the respective registers belonging to the hardware elements, the names of the respective registers, the names of the functions of the respective registers, defining information for the respective control bits of the respective registers, and setting conditions and resetting conditions for the respective registers.

The description now returns to FIG. 11. The system 100 acquires hardware specification information from this hardware document (S31). Specifically, it is not necessary to acquire all of the information noted in the hardware document; for example, it is sufficient even if only information relating to the external register groups constituting the interface between the hardware and software is acquired. However, the information used is not limited to information relating to the external registers; other hardware information may also be utilized.

The system 100 extracts interface specification information on the basis of the acquired hardware specification information (S32). For example, register numbers (addresses), register names (mnemonics), register function names, definitions of respective control bits of the registers, register setting conditions and resetting conditions and the like may be cited as examples of interface specification information. For instance, "data communications transfer state register", "channel side transmission buffer", "internal clock register" and the like may be cited as register function names.

The system 100 classifies the register groups (S33). Specifically, the system 100 classifies the register groups into a plurality of groups on the basis of the register function names. Specifically, for instance, one or a plurality of keywords are defined in advance for each group, and in cases where registers that have function names coinciding with or similar to these keywords are discovered, these registers are classified into these groups.

For example, the first group K01 is defined as "data transfer system for resources". For each resource such as the cache memory 23, shared memory 24 and the like, registers used for data transmission to these respective resources, and registers used for the reception of data from these respective resources, belong to this first group. The second group K02 is defined as "data transfer control system for resources". According to transmission and reception, registers used for the control of data transfer, registers indicating the status of data transfer, registers indicating transfer errors and the like belong to this second group.

Similarly, the third group K03 is defined as "data buffer system (according to transmission and reception)", the fourth group K04 is defined as "data buffer control system", the fifth group K05 is defined as "internal data transfer path (path/bus) control system", the sixth group K06 is defined as "external I/F state monitoring system", the seventh group K07 is defined as "device monitoring system", the eighth group K08 is defined as "error system (data parity errors, electrical signal errors and the like)", the ninth group K09 is defined as "timer monitoring system", and the tenth group K10 is defined as "system timer system". Furthermore, the abovementioned register classification is one example; the present invention is not limited to this.

When the system 100 completes the classification of the respective registers, the system 100 enters these classification results in the hardware I/F information table (software-hardware I/F analysis data) 121 (S34). Then, the system 100 judges whether or not any unanalyzed hardware specification information is present (S35). In cases where unanalyzed hardware specification information is present (S35: YES), the system 100 proceeds to the next hardware specification information (S36), and repeats the processing of the abovementioned S31 through S34. Furthermore, in cases where the analysis of all of the hardware specification information to be analyzed has been completed (S35: NO), the system 100 ends this processing.

FIG. 13 is an explanatory diagram which shows one example of the hardware I/F information table 121. This hardware I/F information table 121 is shown as software-hardware I/F analysis data 121 in FIG. 2

For example, the hardware I/F information table 121 can be constructed by respectively associating index numbers, the names of the hardware to which the registers belong, register ID or addresses, register names, function names or a brief description of the functions of the registers, and the names of the groups to which the registers belong.

Figure 14:
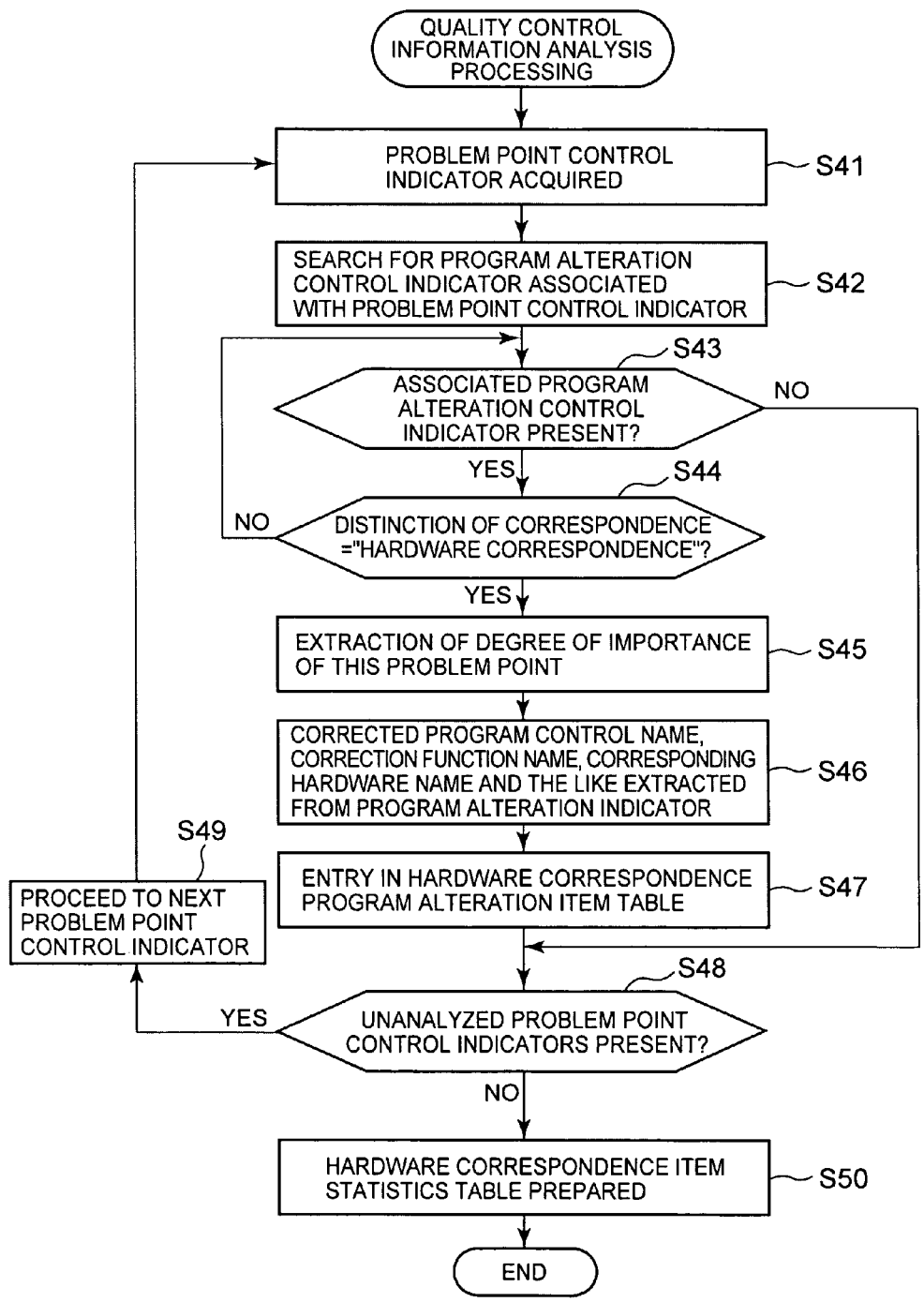
FIG. 14 is a flow chart of the quality control information analysis table.

FIG. 14 is a flow chart which shows an outline of the quality control information analysis processing that is performed by the quality control information analysis part 130 in FIG. 2. The system 100 acquires a problem point control indicator Dq1 as quality control information Dq (S41). Then, the system 100 searches for a program alteration control indicator Dq2 that is associated with the acquired problem point control indicator Dq1 (S42).

Here, the description returns to FIG. 15. Examples of the problem point control indicator Dq1 and program alteration control indicator Dq2 are shown in FIG. 15. In cases where some kind of trouble occurs in the storage controller 10, a problem point control indicator Dq1 is produced. For example, this problem point control indicator can be constructed by respectively associating a problem point control number given for each problem point, the name of this problem point, the data of occurrence of this problem point, the degree of seriousness of this problem point, the handling distinction of this problem point, and the number of the program alteration control indicator Dq2 corresponding to this problem point. For example, "specification violation", "handling of hardware" and the like can be cited as examples of the "handling distinction" of the problem point. "Handling of hardware" mainly accompanies hardware defects and specification alterations, and indicates that a corresponding correction has been made on the side of the software (especially control programs on the software side).

A program alteration control indicator Dq2 is produced in cases where the source program is corrected in order to eliminate a problem point, and is controlled in association with a problem point control indicator Dq1. For example, this program alteration control indicator contains the item name, the version number of the product in which the trouble has occurred, the version number following correction, the content of the trouble that has occurred (construction at the time of occurrence of the trouble, conditions of occurrence of the trouble, result of the trouble and the like), the associated keyword used to search for the trouble, the cause of the trouble, the associated keyword used to search for the cause, the countermeasures performed in order to eliminate the trouble, and the associated keyword used to search for these countermeasures.

Furthermore, for example, as is shown in the lower part of the figure, the program alteration control indicator Dq2 contains the name of the source file that is altered in order to eliminate the trouble, the name of the altered function, the name of the altered table, and the name of the altered macro.

Furthermore, the program alteration control indicator Dq2 contains the name of the control relating to the program alteration, and the name of the hardware relating to this program alteration. For example, the control and hardware to which the program alteration control indicator relates can easily be controlled by including information used to specify the control name and hardware name in the name that is given to the program alteration control indicator Dq2.

The description now returns to FIG. 14. The system 100 judges whether or not a program alteration control indicator associated with the problem point control indicator acquired in S41 is present (S43). Then, in cases where a program alteration control indicator is associated with this problem point control indicator (S43: YES), the system 100 judges whether or not the "handling distinction" of this problem point control indicator is "handling of hardware" (S44).

In cases where the problem point control indicator is a problem point control indictor relating to "handling of hardware" (S44: YES), the system 100 extracts the "degree of seriousness" from this problem point control indicator (S45). Furthermore, the system 100 respectively acquires the corrected program control name, the corrected source file name, the corrected function name, the corrected table name, the corrected macro name and the name of the hardware in which these corrections were performed from one or a plurality of program alteration control indicators associated with this problem point control indicator (S46). The system 100 enters these respective sets of acquired information in a hardware handling program alteration condition table 131A.

Here, reference is made to FIG. 16. FIG. 16 is an explanatory diagram which shows one example of the hardware handling program alteration condition table (hereafter also referred to as the "alteration condition table") 131A. For example, this alteration condition table 131A can be constructed by associating an index number, the hardware program alteration control indicator number (P number) relating to the correction, the problem point control indicator number (M number), the degree of seriousness of the trouble that was the cause of the correction, the corrected program control name, the corrected file name, the corrected function name, and the name of the hardware that was the object of correction. In addition, corrected macro names and table names can also be added.

Thus, in cases where the problem point control indicator is associated with hardware, the system 100 extracts information such as the corrected source file, functions and the like from all of the program alteration control indicators associated with this problem point control indicator, and registers this information in the alteration condition table 131A. In cases where not even a single program alteration control indicator is associated with the problem point control indicator (S43: NO), the system 100 skips S44 through S47.

Then, the system 100 judges whether or not any unanalyzed problem point control indicators remain (S48). In cases where unanalyzed problem point control indicators are present (S48: YES), the system 100 proceeds to the next problem point control indicator (S49), and repeats the processing of the abovementioned S41 through S47.

In cases where all of the problem point control indicators to be analyzed have been analyzed (S48: NO), the system 100 produces a hardware handling condition statistics table (hereafter also referred to as the "condition statistics table") 131B (S50), and ends this processing.

FIG. 17 is an explanatory diagram which shows one example of the hardware handling condition statistics table 131B. For example, this condition statistics table 131B can be constructed by associating an index number, the function name, and the number of cases of occurrence of the trouble associated with this function according to the degree of seriousness.

Figure 18:
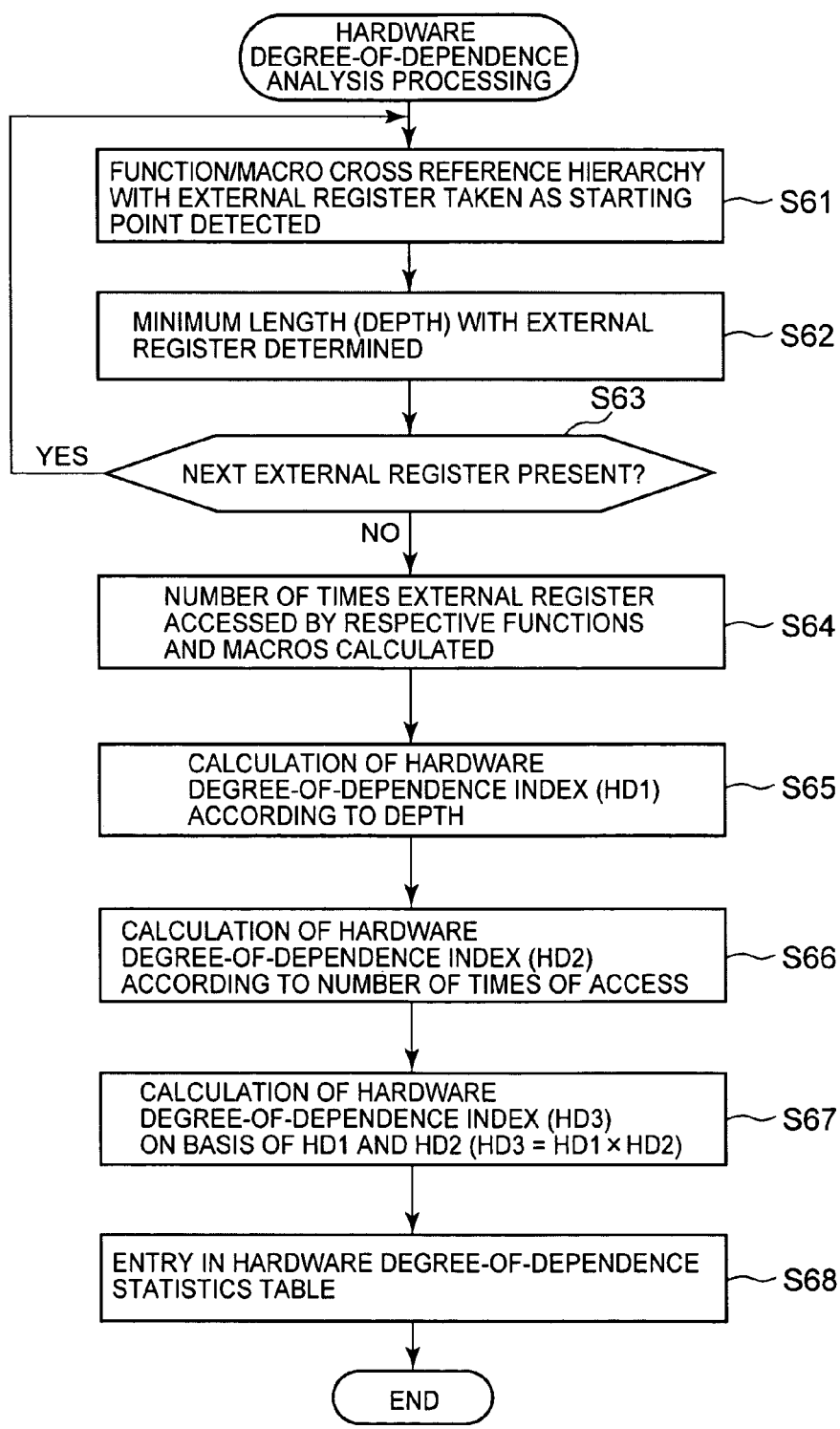
FIG. 18 is a flow chart which shows the hardware degree-of-dependence analysis processing.

FIG. 18 is a flow chart which shows an outline of the hardware degree-of-dependence analysis processing that is performed by the hardware degree-of-dependence analysis part 140 shown in FIG. 2. The system 100 detects the cross reference hierarchy of the respective functions and respective macros that take the external register as a starting point (S61). Next, on the basis of the cross reference hierarchy, the system 100 respectively determines the logical distance (depth) between the external register and the respective functions and respective macros (S62).

Figure 19:
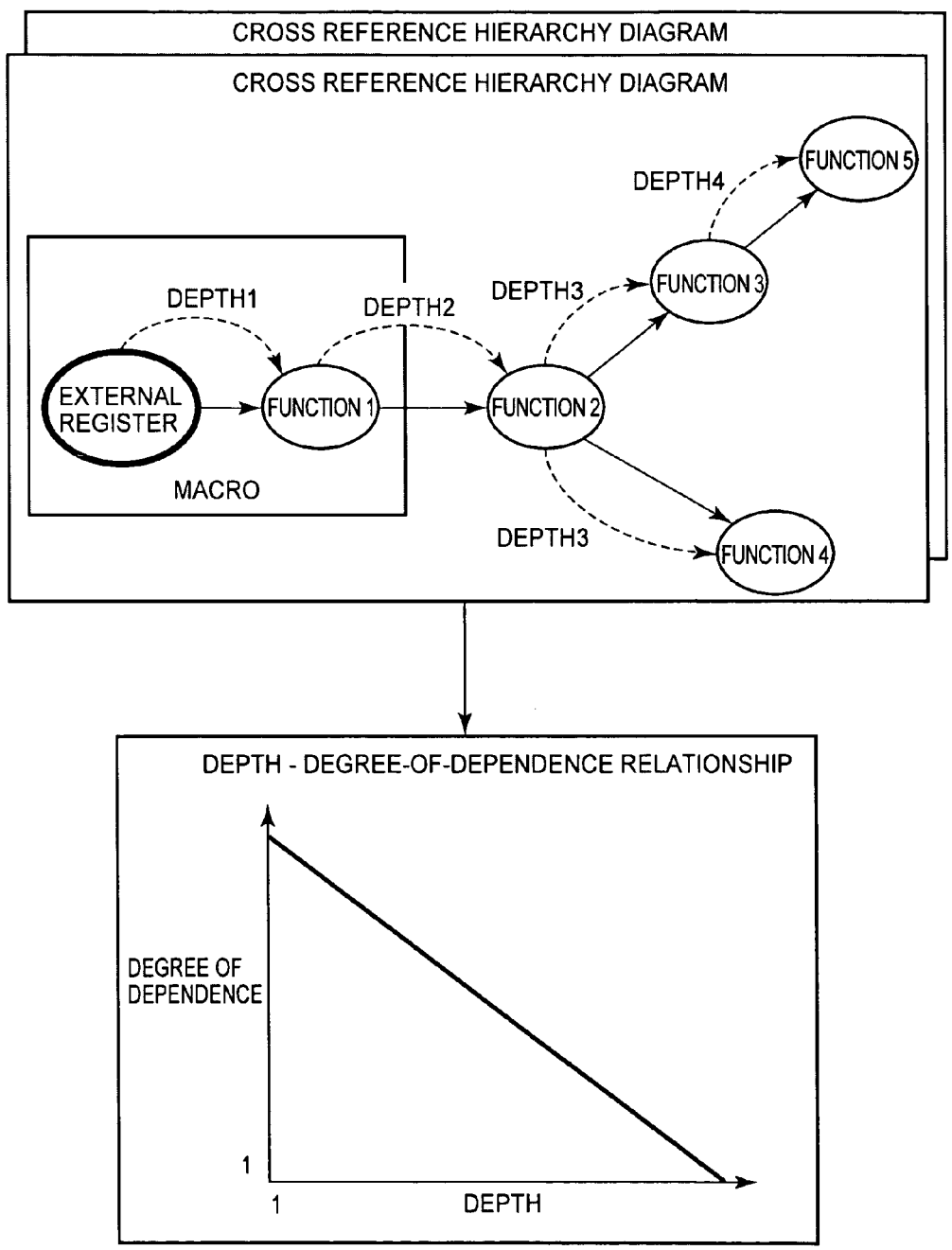
FIG. 19 is an explanatory diagram which respectively shows the cross reference states between respective functions using the external register as a starting point, and the relationship between the logical distance (depth) with the external register and the degree of hardware dependence.

Here, the relationship between the cross reference hierarchy and the distance (depth) will be described with reference to FIG. 19. A diagram which indicates the manner of connection of the functions and macros (functions inside macros; both of these will be referred to collectively as "functions" in some cases) taking the external register as a starting point as in the upper left portion of FIG. 19 is a cross reference hierarchy diagram. For instance, in the example shown in the figure, the external register is directly used by function 1, and the external register and function 1 are present inside a macro.

Furthermore, the calculation results of function 1 are used by function 2, and the calculation results of function 2 are used by function 3 and function 4. Furthermore, the calculation results of function 3 are used by function 5.

Here, in the present example, the logical distance between the external register and the respective functions, i. e., the degree of closeness with the external register, is considered in units known as "depth". This is set so that the value of the depth increases as the distance from the external register increases. For example, since function 1 directly uses the external register, the depth in this case is "1". Since function 2 uses the external register via function 1, the depth in this case is "2". Subsequently, in the same manner, the value of the depth increases in increments of 1 as the logical distance from the external register increases one stage at a time.

As is shown in the lower portion of FIG. 19, the degree of dependence of the depth value on the hardware is in an inversely proportional relationship. As the depth value decreases, the degree of closeness with the external register and the degree of proximity increase; as a result, the degree of dependence on the hardware associated with the increases. Conversely, as the depth value increases, the external value is indirectly used, so that the degree of dependence on the hardware drops. As the logical distance from the external register increases, the effect of alterations is absorbed at an intermediate point even in cases where hardware specifications relating to the external register are altered, so that there tends to be less susceptibility to such effects.

The description returns to FIG. 18. The system 100 respectively determines the cross reference hierarchy and depth for a certain external register (S61, S62), and then judges whether or not any external register that is to be analyzed next is present (S63). The processing of S61 and S62 is repeated until the cross reference hierarchy and depth have been respectively determined for all of the external register (S63: YES). In cases where analysis has been completed for all of the external registers (S63: NO), the system 100 respectively calculates the number of times that the respective functions have accessed the external register (S64).

On the basis of the depth, the system 100 respectively calculates a first hardware degree-of-dependence indicator HD1 for each function (S65). As is shown in FIG. 19, the value of the depth and the degree of dependence on the hardware are in an inversely proportional relationship. Accordingly, the system 100 calculates the first hardware degree-of-dependence indicator HD1 so that the value of the first hardware degree-of-dependence indicator HD1 increases as the value of the depth decreases. For instance, the system 100 can set the first hardware degree-of-dependence indicator HD1 in the range of the natural numbers 0 to 10 so that HD1=10 when the depth=1, HD1=9 when the depth=2, HD1=8 when the depth=3, and so on.

Next, on the basis of the number of times that the respective functions have accessed the external register, the system 100 respectively calculates a second hardware degree-of-dependence indicator HD2 (S66). For-instance, this second hardware degree-of-dependence indicator HD2 can be calculated according to the number of lines accessed in the external register in proportion to the total number of steps of the function (HD2=total number of lines accessed in the external register/total number of steps of the function).

Figure 20:
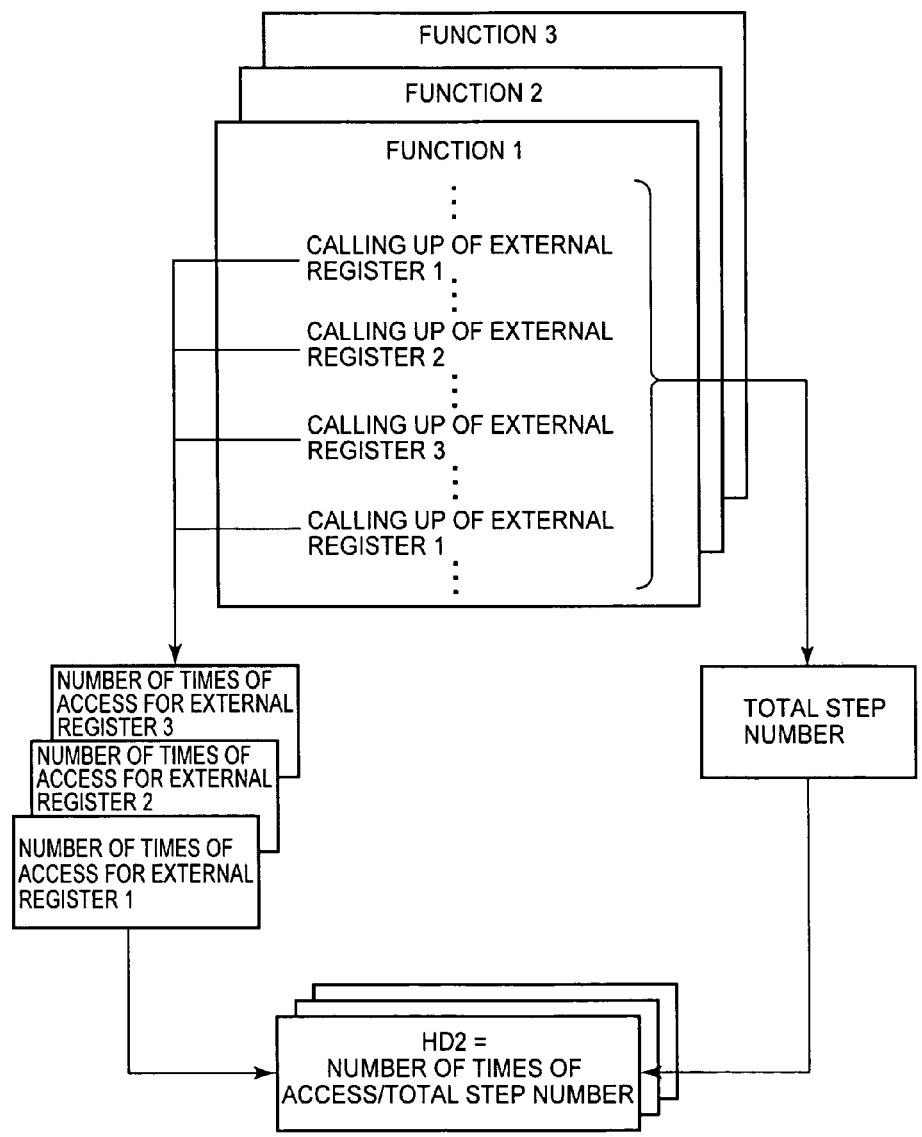
FIG. 20 is an explanatory diagram which shows how the hardware degree-of-dependence indicators are determined from the ratio of the number of lines accessed in the external register and the total number of steps.

FIG. 20 is an explanatory diagram which shows in model form how the second hardware degree-of-dependence indicator HD2 is calculated. Each function is respectively constructed from a plurality of lines (steps), and the necessary external registers are called up at required locations.

Accordingly, inside the function, the number of lines accessed in the external register (number of times of access) is respectively calculated for each external register, and the total number of steps of the function is determined. Then, the value obtained by respectively dividing the number of lines accessed in each external register by the total number of steps is used as the second hardware degree-of-dependence indicator HD2. In cases where even division is impossible, an integer can be obtained by rounding in which 4 is discarded and 5 is included. Thus, it may be considered that the degree of dependence on the hardware associated with the external register increases with an increase in the frequency with which the external register is called up inside the function.

The description now returns to FIG. 18. After respectively determining the rotationally symmetrical hardware degree-of-dependence indicators HD1 and HD2 (S65, S66), the system 100 calculates a third hardware degree-of-dependence indicator HD3 on the basis of these respective hardware degree-of-dependence indicators HD1 and HD2 (S67). For example, this third hardware degree-of-dependence indicator HD3 can be determined by multiplying the respective hardware degree-of-dependence indicators HD1 and HD2 (HD3=HD1×HD2). Furthermore, in cases where either HD1 or HD2 is considered to be more important, weighting can also be performed.

Then, the system 100 enters the third hardware degree-of-dependence indicator HD3 in a hardware degree-of-dependence statistics table 141 (S68). This hardware degree-of-dependence statistics table 141 is shown as "hardware degree-of-dependence information" in FIG. 2.

Figure 21:
FIG. 21 is an explanatory diagram of the hardware degree-of-dependence statistics table.

FIG. 21 is an explanatory diagram which shows one example of the hardware degree-of-dependence statistics table 141. For example, this table 141 can be constructed by respectively associating the function name, the hardware type, the hardware classification and the hardware degree of dependence (HD3). The hardware type refers to the type of the hardware used by the function via the external register, and the hardware classification indicates the name of the classification destination group of the external register. In this way, the hardware on which dependence is shown, and the degree of this dependence, can be grasped at a glance for each function.

Figure 22:
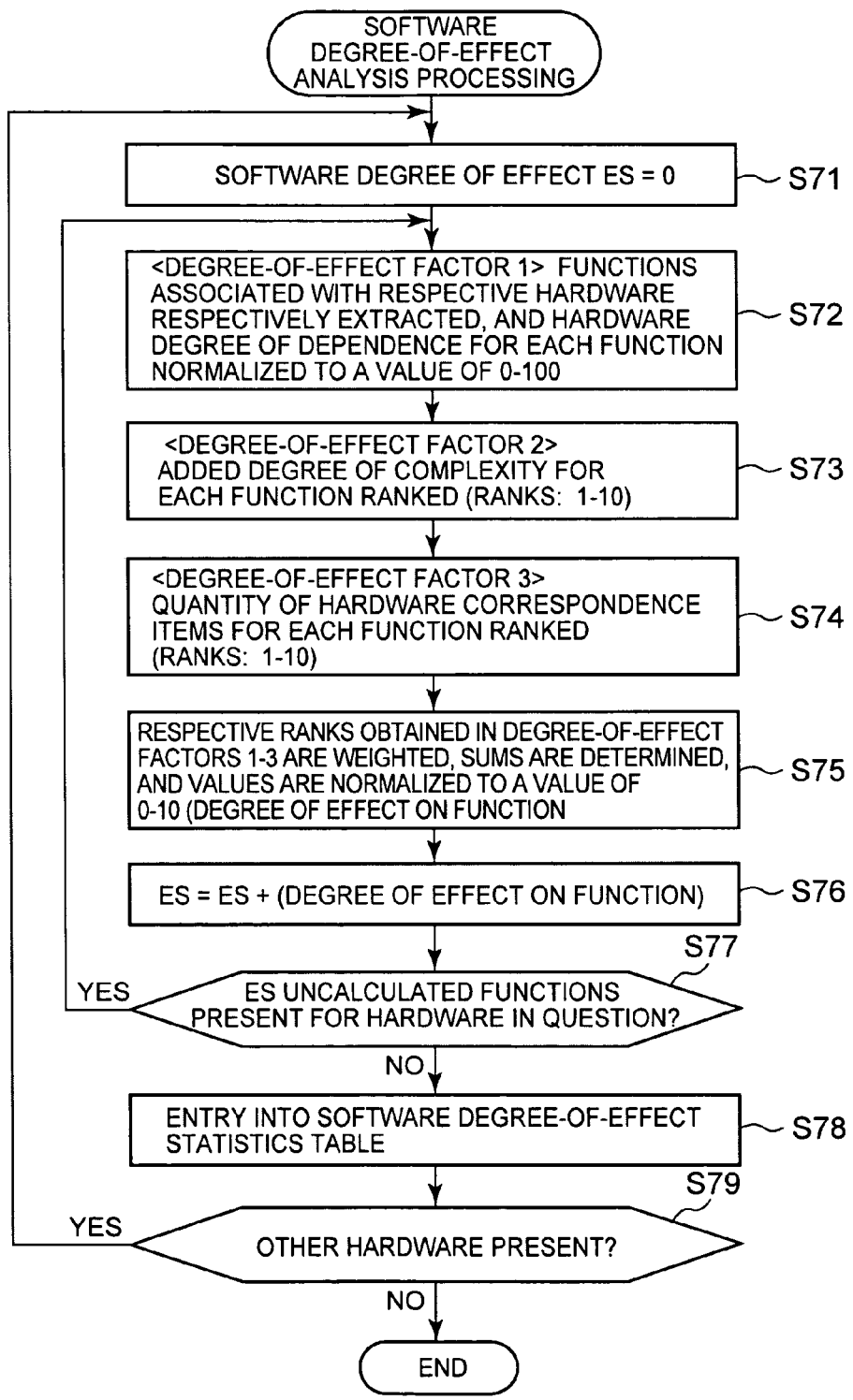
FIG. 22 is a flow chart which shows the software degree-of-effect analysis processing.

FIG. 22 is a flow chart which shows an outline of the software degree-of-effect analysis processing that is performed by the source degree-of-effect analysis part 150 shown in FIG. 2. First, the system 100 initializes the value of the software degree of effect ES (S71).

Next, as is described below, the system 100 respectively determines a plurality of types of degree-of-effect factors (S72 through S74), weights the values of the respective degree-of-effect factors (S75), and calculates the software degree of effect ES (S76).

As the first degree-of-effect factor, the system 100 respectively extracts the functions relating to the respective hardware elements (see FIG. 17), and normalizes the hardware degree-of-dependence indicators (HD3) of the respective extracted functions to values of 0 to 10 (S72).

As the second degree-of-effect factor, the system 100 ranks the degrees of tracking complexity of the respective functions using values of 0 to 10 (S73).

As the third degree-of-effect factor, the system 100 ranks the quantities of the hardware handling items of the respective functions using values of 0 to 10 (S74).

Then, the system 100 determines sums with weighting of the ranks obtained by the respective degree-of-effect factors, and normalizes these sums using values of 0 to 10 (S75). The total ranks obtained by normalizing these sums indicate the degree of the effect exerted on the functions by the hardware.

The system 100 adds the degree of the effect obtained on S75 to the software degree of effect ES (S76). Then, for the hardware currently being analyzed, the system 100 judges whether or not functions for which the software degree of effect ES has not yet been calculated are present (S77). In cases where functions for which the software degree of effect ES has not yet been calculated are present (S77: YES), the system 100 repeats the processing of S72 through S76.

In cases where the software degree of effect ES has respectively been calculated for all of the functions relating to the hardware (S77: NO), the system 100 enters the respective calculated software degrees of effect ES into the software degree-of-effect statistics table 23 (S78). The system 100 judges whether or not other hardware to be analyzed is present (S79), and in cases where hardware that has not yet been analyzed is present (S79: YES), the system 100 repeats the processing of S71 through S78.

FIG. 23 is an explanatory diagram which shows one example of the software degree-of-effect statistics table 151. This statistics table 151 is shown as "software degree-of-effect information" in FIG. 2. For example, this statistics table 151 can be constructed by respective associating the classification of the registers belonging to the hardware, the degree of the effect of the registers on the hardware (ES), and the number of estimation processes (persons×months) required in order to correct the effect on the software, for each hardware element. Furthermore, the register classification of "ALL" refers to the registers of all of the groups belonging to the hardware. In other words, the software degree of effect in cases where the register classification is "ALL" is a value that tabulates the software degrees of effect for each group relating to the hardware. Furthermore, the number of estimation processes can be determined by defining the number of processes required for each unit value of the software degree of effect in advance.

Furthermore, three classifications, i. e., the first degree-of-effect factor through third degree-of-effect factor, were cited as basic indicators for determining the software degree of effect ES. However, the present invention is not limited to this; other factors may also be considered, and one or two of the degree-of-effect factors among the three degree-of-effect factors may be excluded. Furthermore, a construction may also be used in which the degree-of-effect factors used to determine the software degree of effect is varies for each software type. Furthermore, the following types of quantitative information can also be utilized as tracking complexity information. For example, a first total value of the mother function and daughter function (Fan-IN+Fan-OUT) can be used. Alternatively, a second total value of the mother function and daughter function (trans Fan-IN+trans Fan-OUT) can be used. This second total value is the total number of relationships in which in which the functions are directly or indirectly connected in a mother-daughter relationship. Furthermore, metrics information such as complexity or metal effort of Halstead's metrics can also be used.

Since the present example is constructed as described above, the following merits are obtained. In the present example, the inter-dependence relationship between hardware elements and software elements can be grasped, so that the scope and magnitude of the effects of alterations in the hardware elements on the software elements can be predicted. Accordingly, the development of the storage controller 10, which is a system product in which software and hardware cooperate, can be supported more appropriately. Specifically, the development of the system product can be performed while recognizing a high degree of cooperation between hardware and software, so that the working efficiency of the development work is improved.

Furthermore, in the present example, for instance, alterations in the hardware that have a broad and deep effect on the software can also be prevented. Accordingly, the occurrence of software revision work and verification work can be suppressed, so that the software can be efficiently developed, and the development costs can be reduced.

Furthermore, in the present example, software degree-of-effect information can be respectively referred to by both the hardware development section and software development section. Accordingly, the hardware developer can plan the hardware while taking into account the effect of the hardware on the software, and on the other hand, the software developer can produce the source file while grasping the hardware on which the source file depends, and the degree of this dependence. Thus, the hardware developer and software developer can be endowed with a shared cognizance, so that cooperative development work can be pursued.

Furthermore, in cases where a new type of storage controller is developed, the number of processes, time, cost and the like required for development can be predicted by referring to the software degree of dependence relating to the old type of storage controller.

Furthermore, the present invention is not limited to the abovementioned embodiment. A person skilled in the art can make various additions, alterations and the like within the scope of the present invention. The present invention is especially useful when used in a storage controller, which is a system product; however, the present invention is not limited to storage controllers, and can be widely used in various other times of system products. Examples of such system products include portable telephones, portable information terminals, various types of intelligent household electrical products, aircraft, ships and the like.

What is claimed is:

1. A development support system which supports the development of software for a storage controller comprising:
   a front-end control part which has an information processing system that is used to control the exchange of data with hosts;
   a storage controller group which provides a storage area;
   a back-end control part which has an information processing system that is used to control the exchange of data with the storage controller group;
   a memory part which is shared by said front-end control part and said back-end control part;
   software which is respectively loaded in said front-end control part and said back-end control part, and which respectively controls said respective information processing systems of these respective communications control parts;
   a software information analysis part which acquires specification information relating to said software, and which analyzes the structure of specified software element groups that constitute said software;
   a hardware information analysis part which acquires specification information at least relating to the hardware respectively constituting said front-end control part and said back-end control part, and which analyzes the structure of specified hardware element groups that constitute said hardware;
   a dependence relationship analysis part which analyzes the specification dependence relationship between said hardware element groups and said software element groups on the basis of the analysis results obtained by said software information analysis part and the analysis results obtained by said hardware information analysis part;
   a degree-of-effect prediction part which predicts, in cases where one or a plurality of the hardware elements in said hardware element group and corresponding hardware specifications are deliberately altered, the degree of the effect of alteration on specifications of said software element group, on the basis of the analysis results obtained by said dependence relationship analysis part; and
   an information providing part which provides information indicating the degree of the effect that is predicted by said degree-of-effect prediction part to the outside, wherein
   at least a source program is contained in said specification information relating to the software,
   at least information relating to the interface between said software and said hardware is contained in said specification information relating to the hardware,
   at least function groups contained in said source program are contained in said software element groups,
   at least register groups relating to said interface are contained in said hardware element groups,
   (1) said software information analysis part analyzes the interrelationships between the respective functions of said function groups,
   (2) said hardware information analysis part classifies said register groups according to functions, and
   (3) said dependence relationship analysis part performs:
   (3A) analyzing the hierarchical structure of said function groups that directly or indirectly utilize said registers for each of the respective registers in said register groups, and detecting the logical distance between said registers and the functions utilizing said registers for each of said registers on the basis of the analyzed hierarchical structure,
   (3B) analyzing the conditions of utilization of said register groups for each of the functions of said function groups, and
   (3C) respectively detecting the degree of dependence to which said respective functions depend on said respective registers.

2. The development support system according to claim 1, wherein the specification dependence relationship between said hardware element groups and said software element groups indicates the degree to which the respective software elements utilize the respective hardware elements.

3. The development support system according to claim 2, wherein the degree to which the respective software elements utilize the respective hardware elements is determined by analyzing interface elements between the software elements and the hardware elements.

4. The development support system according to claim 3, wherein the interface elements between the software elements and the hardware elements include registers.

5. The development support system according to claim 2, wherein the degree to which the respective software elements utilize the respective hardware elements is determined by analyzing connection relationship of a hierarchical structure between the software elements and the hardware elements.

6. The development support system according to claim 1, wherein said degree-of-effect prediction part respectively detects the degree of the effect that is exerted on each register of said register group in cases where said hardware corresponding to said register is altered, said degree of the effect being detected on the basis of said degree of dependence that is detected by said dependence relationship analysis part.

7. The development support system according to claim 6, wherein said degree-of-effect prediction part acquires quality control information for said software, and respectively detects said respective degrees of the effect on the basis of the acquired quality control information and said degree of dependence.

8. A development support system which supports the development of software for a storage controller comprising:
a front-end control part which has an information processing system that is used to control the exchange of data with hosts;
a storage controller group which provides a storage area;
a back-end control part which has an information processing system that is used to control the exchange of data with the storage controller group;
a memory part which is shared by said front-end control part and said back-end control part; and
software which is respectively loaded in said front-end control part and said back-end control part, and which respectively controls said respective information processing systems of these respective communications control parts;
said storage controller software development support system further comprising:
a software information analysis part which acquires specification information relating to said software, and which analyzes the structure of specified software element groups that constitute said software;
a hardware information analysis part which acquires specification information at least relating to the hardware respectively constituting said front-end control part and said back-end control part, and which analyzes the structure of specified hardware element groups that constitute said hardware;
a dependence relationship analysis part which analyzes the dependence relationship between said hardware element groups and said software element groups on the basis of the analysis results obtained by said software information analysis part and the analysis results obtained by said hardware information analysis part;
a degree-of-effect prediction part which predicts, in cases where one or a plurality of the hardware elements in said hardware element group are altered, the degree of the effect of alteration on said software element group, on the basis of the analysis results obtained by said dependence relationship analysis part; and
an information providing part which provides information indicating the degree of the effect that is predicted by said degree-of-effect prediction part to the outside, wherein
at least a source program is contained in said specification information relating to the software;
at least information relating to the interface between said software and said hardware is contained in said specification information relating to the hardware;
at least function groups contained in said source program are contained in said software element groups;
at least register groups relating to said interface are contained in said hardware element groups;
(1) said software information analysis part analyzes the interrelationships between the respective functions of said function groups;
(2) said hardware information analysis part classifies said register groups according to functions;
(3) said dependence relationship analysis part
(3A) analyzes the hierarchical structure of said function groups that directly or indirectly utilize said registers for each of the respective registers in said register groups, and detects the logical distance between said registers and the functions utilizing said registers for each of said registers on the basis of the analyzed hierarchical structure,
(3B) analyzes the conditions of utilization of said register groups for each of the functions of said function groups, and
(3C) respectively detects the degree of dependence to which said respective functions depend on said respective registers; and
(4) said degree-of-effect prediction part respectively detects the degree of the effect that is exerted on each register of said register group in cases where said hardware corresponding to said register is altered, said degree of the effect being detected on the basis of said degree of dependence that is detected by said dependence relationship analysis part.

9. The development support system according to claim 8, wherein said degree-of-effect prediction part acquires quality control information for said software, and respectively detects said respective degrees of the effect on the basis of the acquired quality control information and said degree of dependence.

10. A method for supporting the development of software for a storage controller comprising a front-end control part which has an information processing system that is used to control the exchange of data with a host device, a storage controller group which provides a storage area, a back-end control part which has an information processing system that is used to control the exchange of data with the storage controller group, a memory part which is shared by said front-end control part and said back-end control part, and software which is respectively disposed in said front-end control part and said back-end control part, and which respectively controls said respective information processing systems of these respective communications control parts,
said method comprising:
a software information analysis step of acquiring specification information relating to said software is acquired, and analyzing the structure of specified software element groups constituting said software;

a hardware information analysis step of acquiring at least specification information relating to the hardware respectively constituting said front-end control part and said back-end control part, and analyzing the structure of specified hardware element groups constituting said hardware; and a dependence relationship analysis step of analyzing a specification dependence relationship between said hardware element groups and said software element groups on the basis of the analysis results obtained in said software information analysis step and the analysis results obtained in said hardware information analysis step, wherein at least a source program is contained in said specification information relating to the software, at least information relating to the interface between said software and said hardware is contained in said specification information relating to the hardware, at least function groups contained in said source program are contained in said software element groups, at least register groups relating to said interface are contained in said hardware element groups, and said method further comprising:

(1) analyzing the interrelationships between the respective functions of said function groups;

(2) classifying said register groups according to functions; and (3A) analyzing the hierarchical structure of said function groups that directly or indirectly utilize said registers for each of the respective registers in said register groups, and detecting the logical distance between said registers and the functions utilizing said registers for each of said registers on the basis of the analyzed hierarchical structure, (3B) analyzing the conditions of utilization of said register groups for each of the functions of said function groups, and (3C) respectively detecting the degree of dependence to which said respective functions depend on said respective registers.

11. The method according to claim 10, further comprising a degree-of-effect prediction step of predicting the degree of the effect that is exerted on specifications of software element groups by deliberately altering one or a plurality of the hardware elements in said hardware element groups and corresponding hardware specifications, on the basis of the analysis results obtained in said dependence relationship analysis step.

12. The method according to claim 11, wherein the specification dependence relationship between said hardware element groups and said software element groups indicates the degree to which the respective software elements utilize the respective hardware elements.

13. The method according to claim 12, wherein the degree to which the respective software elements utilize the respective hardware elements is determined by analyzing interface elements between the software elements and the hardware elements.

14. The method according to claim 13, wherein the interface elements between the software elements and the hardware elements include registers.

15. The method according to claim 12, wherein the degree to which the respective software elements utilize the respective hardware elements is determined by analyzing connection relationship of a hierarchical structure between the software elements and the hardware elements.

16. The development support system according to claim 10, further comprising respectively detecting the degree of the effect that is exerted on each register of said register group in cases where said hardware corresponding to said register is altered, wherein said degree of the effect is detected on the basis of said degree of dependence that is detected.

17. The development support system according to claim 16, further comprising:

acquiring quality control information for said software; and respectively detecting said respective degrees of the effect on the basis of the acquired quality control information and said degree of dependence.

* * * * *